(12) United States Patent
Flick

(10) Patent No.: US 9,928,455 B2
(45) Date of Patent: Mar. 27, 2018

(54) CONTAINER AND CODE OF SYSTEM FOR PREPARING A BEVERAGE OR FOODSTUFF

(71) Applicant: Nestec S. A., Vevey (CH)

(72) Inventor: Jean-Marc Flick, Pomy (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 15/122,576

(22) PCT Filed: May 13, 2015

(86) PCT No.: PCT/EP2015/060561
§ 371 (c)(1),
(2) Date: Aug. 30, 2016

(87) PCT Pub. No.: WO2015/173289
PCT Pub. Date: Nov. 19, 2015

(65) Prior Publication Data
US 2017/0068878 A1    Mar. 9, 2017

(30) Foreign Application Priority Data

May 13, 2014  (EP) .................................... 14168063
Jan. 21, 2015  (EP) .................................... 15151956

(51) Int. Cl.
| | | |
|---|---|---|
| *G06K 7/10* | (2006.01) | |
| *G06K 19/067* | (2006.01) | |
| *A47J 31/44* | (2006.01) | |
| *G06K 19/06* | (2006.01) | |

(Continued)

(52) U.S. Cl.
CPC .............. *G06K 19/067* (2013.01); *A23L 5/00* (2016.08); *A47J 31/4492* (2013.01); *G06K 7/065* (2013.01); *G06K 19/06018* (2013.01); *G06K 19/06028* (2013.01); *G06K 19/06168* (2013.01); *A23V 2002/00* (2013.01)

(58) Field of Classification Search
USPC .................................... 235/375, 462.01, 494
See application file for complete search history.

(56) References Cited

U.S. PATENT DOCUMENTS

| | | | |
|---|---|---|---|
| 4,567,361 A | 1/1986 | Rosenthal | |
| 6,543,691 B1 * | 4/2003 | Lemelson | ................ G06K 7/14 235/456 |

(Continued)

FOREIGN PATENT DOCUMENTS

| | | |
|---|---|---|
| DE | 1774490 A1 | 1/1972 |
| EP | 2345351 A1 | 7/2011 |

(Continued)

OTHER PUBLICATIONS

Office Action dated Dec. 29, 2016 in U.S. Appl. No. 15/124,521.

(Continued)

*Primary Examiner* — Tuyen K Vo
(74) *Attorney, Agent, or Firm* — Dunlap Codding, P.C.

(57) ABSTRACT

Containers for a foodstuff or beverage preparation machine that includes beverage or foodstuff preparation material and a code encoding preparation information are disclosed. Beverage or foodstuff preparation machines and systems that can be utilized with the container are also disclosed. Methods of producing and using the containers, machines, and systems are also disclosed.

16 Claims, 9 Drawing Sheets

(51) Int. Cl.
*A23L 5/00* (2016.01)
*G06K 7/06* (2006.01)

(56) References Cited

U.S. PATENT DOCUMENTS

| | | | |
|---|---|---|---|
| 6,808,117 B2* | 10/2004 | Han | H01L 21/681 235/439 |
| 6,866,199 B1* | 3/2005 | Keech | G03C 11/02 235/490 |
| 2002/0056759 A1* | 5/2002 | Schuessler | G06K 19/06028 235/494 |
| 2002/0067855 A1* | 6/2002 | Chiu | G06T 7/80 382/199 |
| 2002/0125330 A1* | 9/2002 | Schuessler | G06K 19/06028 235/494 |
| 2003/0116629 A1* | 6/2003 | Sauve | G01F 22/00 235/462.07 |
| 2006/0060652 A1* | 3/2006 | Trifilo | G06K 7/1095 235/462.01 |
| 2006/0180669 A1* | 8/2006 | Hara | G06K 7/10 235/462.07 |
| 2009/0039162 A1* | 2/2009 | Yen | G06K 7/10544 235/462.11 |
| 2010/0078480 A1 | 4/2010 | Aker | |
| 2010/0112166 A1* | 5/2010 | Levin | A47J 31/005 426/433 |
| 2010/0252632 A1* | 10/2010 | Sowers | G06K 7/1421 235/462.01 |
| 2014/0328983 A1* | 11/2014 | Jarisch | A47J 31/4492 426/232 |

FOREIGN PATENT DOCUMENTS

| | | |
|---|---|---|
| EP | 2594171 A1 | 5/2013 |
| WO | 2015173285 A1 | 11/2015 |
| WO | 2015173292 A1 | 11/2015 |

OTHER PUBLICATIONS

International Search Report, dated Jul. 29, 2015, in PCT/EP2015/060561, filed May 13, 2015.
Written Opinion of the International Searching Authority, dated Jul. 29, 2015, in PCT/EP2015/060561, filed May 13, 2015.
International Search Report, dated Jul. 31, 2015, in PCT/EP2015/060567, filed May 13, 2015.
Written Opinion of the International Searching Authority, dated Jul. 31, 2015, in PCT/EP2015/060567, filed May 13, 2015.
International Search Report, dated Aug. 10, 2015, in PCT/EP2015/060555, filed May 13, 2015.
Written Opinion of the International Searching Authority, dated Aug. 10, 2015, in PCT/EP2015/060555, filed May 13, 2015.

* cited by examiner

CONTAINER AND CODE OF SYSTEM FOR PREPARING A BEVERAGE OR FOODSTUFF

CROSS REFERENCE TO RELATED APPLICATIONS/INCORPORATION BY REFERENCE STATEMENT

This application is a US national stage application filed under 35 USC § 371 of International Application No. PCT/EP2015/060561, filed May 13, 2015; which claims priority to Application No. EP 14168063.7, filed May 13, 2014, and Application No. EP 15151956.8, filed Jan. 21, 2015. The entire contents of the above-referenced application are hereby expressly incorporated herein by reference.

TECHNICAL FIELD

The presently disclosed and/or claimed inventive concept(s) relates to a system for the preparation of a beverage or foodstuff, the system comprising a preparation machine and a container to contain beverage or foodstuff material. More particularly the presently disclosed and/or claimed inventive concept(s) relates to a code arranged on the container that encodes preparation information used by said machine and to a method of processing to decode said information.

BACKGROUND

Increasingly preparation machines for the preparation of a beverage or foodstuff are configured to operate using a container that comprises a single-serving of a preparation material, e.g. coffee, tea, ice cream, yoghurt. The machine is generally configured for preparation by at least partially extracting an ingredient of the material from the container, e.g. by dissolution or brewing. Examples of such machines are provided in EP 2393404 A1, EP 2470053 A1, EP 2533672 A1, EP 2509473 A1, EP 2685874 A1. The machine may alternatively be configured for preparation by processing said material in the container, e.g. with the addition of fluid, such as milk or water, and the application of mixing thereto, such a machine is disclosed in PCT/EP13/072692.

The increased popularity of these machines may be partly attributed to enhanced user convenience compared to a conventional preparation machine, e.g. compared to a manually operated stove-top espresso maker or cafetiére (French press).

It may also be partly attributed to an enhanced preparation process, wherein preparation information specific to the container and/or preparation material therein is: encoded in a code on the container; read by the preparation machine; used by the machine to optimise the preparation process. In particular, the preparation information may comprise operational parameters of the machine, such as: fluid temperature; preparation duration; mixing conditions.

Accordingly, there is a need to code preparation information on the container. Various such codes have been developed, an example is provided in EP 2594171 A1, wherein a periphery of a flange of a capsule comprises a code arranged thereon. The code comprises a formation of rectilinear segments, each of a predetermined same size, each arranged next to each other, hence in a predetermined position. The segments are shaded or blank to encode the information. The segments extend circumferentially on the side of the capsule. The code consists of: a data sequence, which comprises a series of segments for providing the aforesaid preparation information; a start and a stop sequence comprising a unique string (typically 6) of shaded and blank segments to enable the location of the data sequence. Accordingly the code is processed to search for matches to said unique string to locate therefrom the data sequence, which is subsequently decoded. A drawback of the code is that notable processing is required to locate the start and stop sequence. Moreover the start and stop sequence occupy a relatively large amount of space on the capsule, which is both aesthetically displeasing and reduces the option to apply advertisement thereto. A further drawback is that the size of the code is fixed by predetermined bar positions/sizes. In this way it cannot be adapted in size for different encoding densities, i.e. to suit different geometry containers. A yet further drawback is that the data sequence requires notable processing to decode.

BRIEF DESCRIPTION OF THE DRAWINGS

For a better understanding of the presently disclosed and/or claimed inventive concept(s), and to show how embodiments of the same may be carried into effect, reference will now be made, by way of example, to the accompanying diagrammatic drawings in which:

DETAILED DESCRIPTION

Figure 1A:
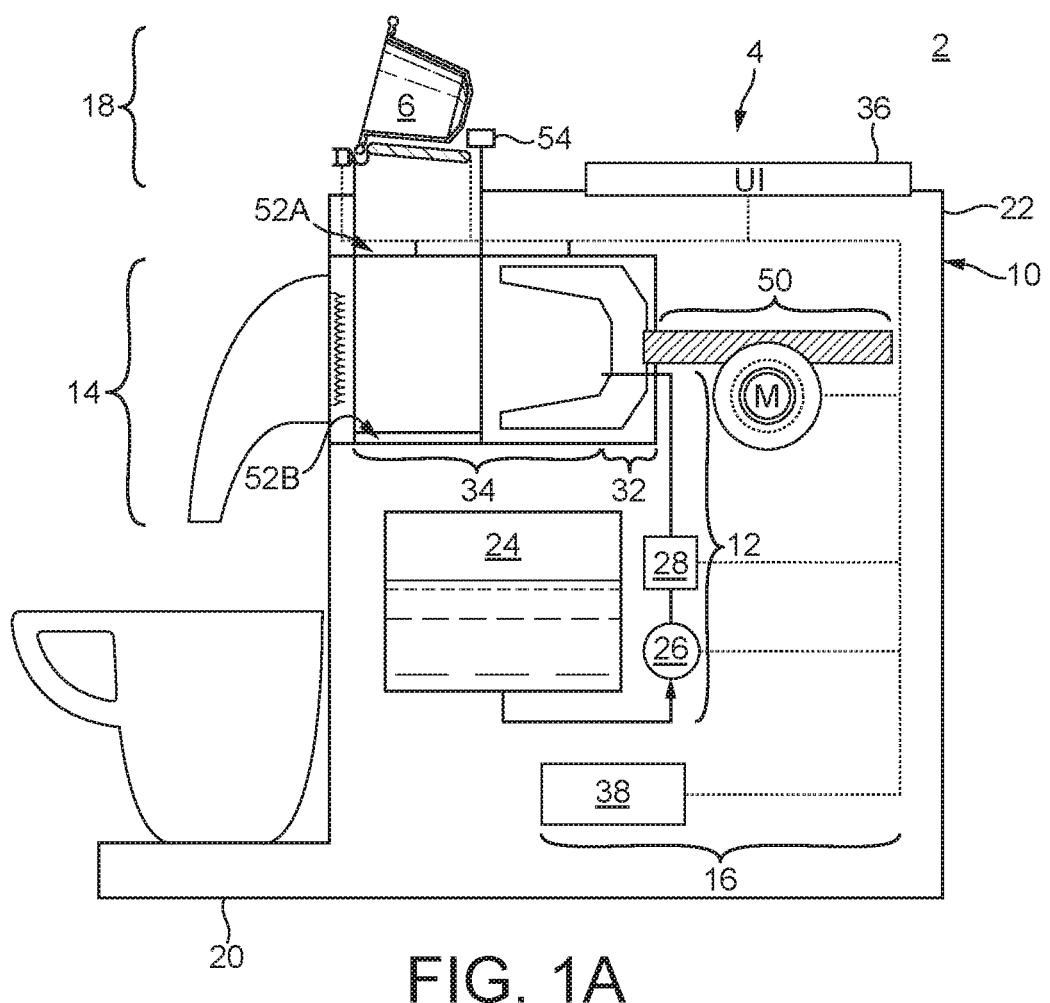
FIG. 1 shows illustrative views of embodiments of a preparation system that comprises a preparation machine and a container according to the presently disclosed and/or claimed inventive concept(s).

One non-limiting object of the presently disclosed and/or claimed inventive concept(s) is to provide a container for beverage or foodstuff preparation material that comprises a code that does not require complex processing.

It would be advantageous to provide such a code that is un-complicated such that it does not comprise a large number of symbols.

It would be advantageous to provide such a code that is cost-effective to produce and that can be read by a cost-effective code reader.

It would be advantageous to provide such a code that can be reliably read, particularly if soiled by foodstuffs or other contaminates.

It would be advantageous to provide such a code that can be adapted in size.

Objects and/or advantageous features of the presently disclosed and/or claimed inventive concept(s) are achieved by: the container according to claim 1; the machine according to claim 10; the system according to claim 12; the method according to claim 13; the attachments according to claims 14 and 15; the use of a container according to claim 16; the computer program according to claim 17; the non-transient computer readable medium according to claim 18.

Disclosed herein according to a first aspect of the presently disclosed and/or claimed inventive concept(s) is provided a container for (e.g. said container is food safe and preferable hermitically sealable) a foodstuff or beverage preparation machine. The container for containing beverage or foodstuff preparation material. The container may be a single-serving container, i.e. it comprises a dosage of foodstuff or beverage material for preparation of a single serving of said product. The container may be a single-use container, i.e. it is intended to be used in a single preparation process after which it may be rendered unusable, e.g. by perforation, penetration, removal of a lid or exhaustion of said material. The container comprises generally on a surface thereof a code encoding preparation information, the code comprising a data sequence having a plurality of marker locations, whereby said marker locations either comprise or do not comprise a marker as a variable to at least partially encode the preparation information therein, with adjacent marker locations separated by a distance of $\Delta x$ (e.g. a distance between corresponding positions on the marker locations), a locator sequence to enable location of the data sequence, the locator sequence comprising at least two adjacent markers, whereby a distance X4 therebetween (e.g. a distance between corresponding positions on the markers) is distinct from the distance(s) $\Delta x$.

Accordingly, one non-limiting object of the presently disclosed and/or claimed inventive concept(s) is achieved since the location of the locator sequence is convenient to determine. The locator sequence may be arranged adjacent to the data sequence and/or the calibration sequence (including sharing markers therewith). Accordingly one non-limiting object of the presently disclosed and/or claimed inventive concept(s) is solved since the marker locations of the data sequence do not require complex processing to read and decode.

The data sequence comprises variable position marker locations unlike the prior art, wherein they are arranged next to each other in predetermined locations. In particular the marker locations are not directly next to each other (i.e. with no gap in-between) or do not have to have a gap the size of another marker location therebetween. To ensure sufficient separation of the marker locations, adjacent marker locations may be separated by at least 20% or 30% of a width of a marker. Such an arrangement is particularly advantageous when using an inductive sensor as its analogue signal requires adequate separation for reliable processing. Adjacent marker locations may not be separated by a width or a plurality of widths of marker locations. A width of a marker location is generally a stored value.

The preparation information may comprise information that is related to a preparation process, e.g. one or more parameters used by the machine such as: temperature (e.g. at container inlet and/or at machine outlet); time; flow rate/volume; pressure; expiry date; container geometric properties (e.g. internal volume, type, shape); container identifier; recipe (e.g. a decomposition of a preparation operation into a plurality of phases, for which one or more of the aforesaid parameters specified).

To ensure there is sufficient information to identify the code and data sequence, in certain non-limiting embodiments, at least one or two of the marker locations of the data sequence comprises a marker.

The adjacent marker locations of the data sequence are generally all substantially equally spaced such that $\Delta x$ is a single fixed amount. In this way the code is less complex to process.

The distance X4 of the locator sequence may be an integer multiple (e.g. a number greater than 1 such as 2, 3, 4) of the $\Delta x$ distance of the data sequence. Alternatively the distance X4 of the locator sequence may be a non-integer multiple of the $\Delta x$ distance (e.g. a number greater than one such as 1.25, 1.5, 1.75, 2.25, 2.5 and so on). Advantageously by having a multiple that is larger than 1 the X4 distance is more convenient to locate and is less susceptible to errors when reading.

The code may further comprise a calibration sequence having at least two adjacent markers with a distance of X1 therebetween (e.g. a distance between corresponding positions on the marker locations/marker), whereby the distance $\Delta x$ between adjacent marker locations of the data sequence is related to the distance X1 of the calibration sequence. Advantageously the marker locations of the data sequence do not require complex processing to read and decode. Moreover, the length of the code can be adapted in size to enable a different encoding density between containers for the same machine, i.e. the spacing of the marker locations can be changed by the calibration sequence and processed without requiring a software update on the code processing system.

The distance X1 of the calibration sequence may be substantially equal to or a multiple of one or more of the $\Delta x$ distance of the data sequence. An advantage of using a larger multiple, i.e. those greater than one (such as or 2 or more 3 or more, e.g.: 2-8 or 3-4) is that the determined X1 distance is less susceptible to errors when read, and thus when reduced in magnitude to determine $\Delta x$, the error in $\Delta x$ is minimised (it is also easier to distinguish from the data sequence). In this way $\Delta x$ can be considered a function $f$ of X1, i.e. $\Delta x = f(X1)$, wherein $f$ s the reciprocal of the said multiple (or alternatively rewriting as $X1 = f(\Delta x)$, wherein $f$ is the said multiple). The said multiple may be any suitable integer numerical value, e.g.: 2, 3, 4, 5-8. Alternatively the said multiple may be a non-integer amount, e.g. 1.25, 1.5, 1.75, 2.25, 2.5 and so on.

The code may further comprise an end portion for identification of an end of the data sequence. The end portion comprises a marker and a marker location at the end of the data sequence (which may or may not comprise a marker), wherein a distance X3 therebetween (e.g. a distance between corresponding positions on the marker locations/marker) is distinct from: the distance X1 of the calibration sequence; the distance $\Delta x$ of the data sequence; the distance X4 of the locator sequence (when these are all present in the code). In this way when the X3 distance is identified the end of the data sequence can be located. The said marker of the end portion is generally the marker adjacent said end marker location of the end portion. In particular, the code can be processed as follows: for a marker location of the data sequence (starting from the first marker location at the start of the data sequence) the X3 distance is added; if a marker is identified as present at the added distance then the end of the data sequence is identified; else the process is repeated for the subsequent marker in the data sequence. Advantageously, the data sequence can have variable number of marker locations (i.e. it can encode a variable number of bits) as the code is configured to self-identify the end of the data sequence.

The distance X3 of the end portion may be an integer multiple (e.g. a number other than 1 such as 2, 3, 4) of the $\Delta x$ distance of the data sequence. Alternatively the distance X3 of the end portion may be a non-integer multiple of the $\Delta x$ distance (e.g. 1.25, 1.5, 1.75, 2.25, 2.5 and so on). Advantageously by having a multiple that is larger than 1 the X3 distance is more convenient to locate and is less susceptible to errors when reading.

To make the various distances X4, X1 (when present), X3 (when present) convenient to identify it may be desirable (in certain non-limiting embodiments) to have a mixture of integer and non-integer multiples of the Δx distance defining them, e.g. X1 is an integer multiple and X3, X4 are non-integer multiples or the converse; X4 is a non-integer multiple and X1 is an integer multiple or the converse; X4 is a non-integer multiple and X3 is an integer multiple or the converse.

In certain non-limiting embodiments, a first marker location of the data sequence, i.e. the start of the data sequence, is arranged a distance Δx (e.g. a distance between corresponding positions on the marker location/marker), from a reference position, whereby said reference position is typically an adjacent marker of either the calibration or locator sequence. Each marker location in the data sequence may be indexed from 1 to the number of bits encoded therein, whereby the 1 references said first marker location.

In certain non-limiting embodiments, the marker locations encode a bit, e.g. a marker location comprising a marker encodes a 1 and a marker location not comprising a marker encodes a 0 (or the converse). The data sequence may encode at least 6 bits of preparation information. In certain non-limiting embodiments, 8, 10, 12 or more bits are encoded.

In certain non-limiting embodiments, the code is a 1-dimensional code, e.g. the markers of the code are generally arranged sequentially to each other, e.g. they are arranged sequentially along a single line that may be linear or circumferentially extending about an axis. The aforesaid X1, X2, X3, X4 and Δx distances (when present) are generally aligned in the said sequentially extending direction. Advantageously, the markers readably by a single reading head of a code reader. In certain non-limiting embodiments, the line is arranged at a periphery of the container, e.g. on the flange or periphery of the lid of the capsule or receptacle, or the rim of a packet.

The code is generally arranged about a container axis of rotation. In this way the code can be conveniently read by a code reader when there is relative rotational movement between a code reader and container about said axis. Advantageously, the code does not require the container to be supplied to the preparation machine with a particular orientation. The markers are typically radially aligned, i.e. a major axis thereof is aligned in the radial direction. The code may be arranged with an average position of a marker (i.e. the midpoint of the marker with respect to the radial direction) having a radial location of 0.5 cm-4 cm, or 0.9-3 cm.

In certain non-limiting embodiments, the markers of the code are substantially the same shape. Advantageously, the markers are convenient to form. The markers are typically rectangular, and may comprise one or more of the following dimensions: a depth of 2 mm-5 μm or 1 mm-10 μm (i.e. when formed by engraving or embossing); a length of 20 mm-1 mm or 10 mm-1.5 mm or 5 mm-1.5 mm or 3 mm-2 mm; a width of 2 mm-0.2 mm or 2 mm-0.3 mm or 1 mm-0.4 mm or 0.9 mm-0.6 mm. A gap between adjacent markers/marker locations may be within 2 mm-0.3 mm, such as (but not limited to) within 1.5 mm-1 mm or 1 mm-0.6 mm. In the example wherein the markers are circumferentially arranged aforesaid can be considered average distances. In a specific example the markers comprise: a length of 2.5 mm; a nominal width of 0.75 mm; a nominal gap therebetween of 0.8 mm. Alternatively the markers may comprise circles or ellipses.

The markers may be formed by one of the following: printing (e.g. by a conventional ink printer: advantageously the code can be conveniently and cost-effectively formed); engraving; embossing. In certain non-limiting embodiments, the markers are formed by electrically conductive portions, such as: indents formed by embossing on a conductive portion of the container/attachment. By forming the code with conductive portions an inductive sensor can comprise the code reader. Advantageously, such a code/sensor configuration is not sensitive the code being soiled by foodstuff or other contaminants. Moreover, the code can be applied and read cost-effectively. The code may be formed directly on a surface of the container, e.g. the substrate for the markers is integral with the container. Alternatively the code may be formed on an attachment (i.e. the attachment according to the fifth aspect), which is attached to the container.

Generally the container comprises a plurality of the aforesaid codes. Advantageously, the encoded preparation information read from each can be processed and checked for consistency. Moreover, the encode information is less vulnerable if one of the codes is damaged or otherwise unreadable.

The container may comprise the beverage or foodstuff preparation material contained therein. The container may comprise one of the following: a capsule; packet; a receptacle for consumption of the beverage or foodstuff therefrom. The capsule may have an internal volume of 5-80 ml. The receptacle may have an internal volume of 150-350 ml. The packet may have an internal volume of 150-350 ml or 200-300 ml or 50-150 depending on the application.

Disclosed herein according to a second aspect of the presently disclosed and/or claimed inventive concept(s) is provided a beverage or foodstuff preparation machine comprising: a preparation unit to receive a container according to the first aspect and to prepare a said beverage or foodstuff therefrom; a code processing system operable to: read a code of a container to obtain encoded preparation information, process the encoded preparation information to decode said information; a control system operable to effect one more of the following: control of said preparation unit using said decoded preparation information (e.g. to execute a preparation operation); use the operation information to monitor container consumption for re-ordering, e.g. via a server system through a communication interface; use preparation information to determine if a container has exceeded its expiry date.

The code processing system may be configured to process the encoded preparation information to locate one or more code reads therein (i.e. a code read comprises information from a read of a single code, a plurality of code reads may be obtained by reading more than once: the same code and/or several codes), and for the or each located code read(s) it may be further configured to: locate the calibration sequence and determine therefrom the distance X1; determine a distance Δx between adjacent marker locations of the data sequence using said determined X1 distance; determine, using said Δx distance, the presence of a marker at each marker location of the data sequence. However in embodiments that do not comprise a calibration sequence the code processing program can be configured to obtain the Δx distance from a stored location.

Locating one or more code reads and/or locating the calibration sequence comprises: locating a locator sequence, which is identified by code read information that corresponds to there being markers arranged a predetermined distance X4 apart. The data sequence is arranged at a known position with respect to the locator sequence, e.g. it is adjacent thereto or adjacent the calibration sequence when present (whereby the calibration sequence is adjacent the data sequence).

Processing the encoded preparation information to locate the calibration sequence of the or each code read may comprise determining the location of the calibration sequence based on the location of the locator sequence (i.e. the calibration sequence is arranged adjacent the locator sequence).

Determining from the calibration sequence the distance X1 may comprise determining the distance between the two associated markers. Determining a distance $\Delta x$ between adjacent marker locations of the data sequence using said determined X1 distance may comprise setting $\Delta x$ equal to X1 or applying a function to X1.

For a code wherein the first marker location of the data sequence, i.e. the start of the data sequence, is arranged a distance $\Delta x$, from a reference position, said determining, using said $\Delta x$ distance, the presence of a marker at each marker location of the data sequence may comprise: adding subsequent $\Delta x$ distances to the reference position to identify subsequent marker locations. Alternatively it may comprise: identifying markers comprising the data sequence and their distance from said reference point; dividing the said distance by $\Delta x$ and applying a floor and/or ceiling function to the result to determine an index of the marker location that the marker relates to.

A first value may be assigned to a marker location when a marker is present and a second value assigned when absent. The first value may be a 1 and the second value may be a 0 or the converse. The preparation information can be determined from the compilation of said first or second values.

Processing the encoded preparation information may comprise, locating an end portion of the data sequence by locating an X3 distance between a marker location of the data sequence and a marker of the end portion, e.g. by adding a predetermined X3 distance to each marker location of the data sequence and checking if there is a marker at the associated position.

Processing the encoded preparation information may comprise checking a number of code reads therein; if below a predetermined amount then processing is either terminated or more code reads are obtained. The predetermined amount may be 2, 3, 4, 5 or more. Processing the encoded preparation information may comprise: checking a code read for an error; if an error is detected then the erroneous code read is discarded. Error checking may comprise: checking a calculated read length of a portion of a code read (e.g. a length of a sequence such as the data sequence) or an entire code read; checking a maximum number of markers identifiable in a portion of a code read or an entire code read; checking if the encoded preparation information is identical between code reads.

The code read information may comprise information relating to a plurality of pulses, whereby a pulse of the absence thereof relates to a marker of the code.

The preparation unit may be configured to prepare a said beverage or foodstuff therefrom in various manners. The preparation unit may be configured to extract an ingredient of the beverage or foodstuff from a container (i.e. a capsule or a packet that comprise the code) and during preparation, and comprises: a fluid supply; and an extraction unit, the extraction unit operable to receive said container and to supply fluid from the fluid supply thereto, whereby a prepared beverage or foodstuff is dispensed from the extraction unit into a receptacle (i.e. the receptacle does not comprise the code) for consumption therefrom. The preparation unit is operable to dispense a beverage or foodstuff into a container (i.e. a receptacle that comprises the code) configured for end-user consumption therefrom and comprises: a fluid supply; and a mixing unit, the mixing unit operable to mix fluid from the fluid supply with preparation material from a preparation material container of the preparation unit. The preparation unit is operable to prepare a beverage or foodstuff in a container (i.e. a receptacle that comprises the code) configured for end-user consumption therefrom and comprises: a fluid supply; and a mixing unit, the mixing unit operable to mix fluid from the fluid supply with preparation material supplied in said receptacle. The preparation unit is operable to prepare a beverage or foodstuff (e.g. using the aforesaid fluid supply and mixing unit) in a receptacle (that does not comprise the code) configured for end-user consumption therefrom, and is operable to dispense preparation material from a container (i.e. a capsule or packet comprising the code) into said receptacle.

The code reading system may be operable to effect read the code of a container when received by the machine, for example (but not by way of limitation) such that encoded preparation information is provided to the code processing device. Said reading of the code may comprise control of a code reading mechanism of the code reading system to effect relative movement between the code and a code reader.

Disclosed herein according to a third aspect of the presently disclosed and/or claimed inventive concept(s) is provided a beverage or foodstuff preparation system comprising a container according to the first aspect and a beverage or foodstuff preparation machine according to the second aspect.

Disclosed herein according to a fourth aspect of the presently disclosed and/or claimed inventive concept(s) is provided a method of preparing a beverage or foodstuff, using the system according to the third aspect, the method comprising: reading a code of a container to obtain encoded preparation information; processing the encoded preparation information to decode said information; operating a control system to effect one more of the following: control of said preparation unit using said decoded preparation information; use the operation information to monitor container consumption for re-ordering, e.g. via a server system through a communication interface; use preparation information to determine if a container has exceeded its expiry date.

The method may further comprise any of the steps for processing of the code as defined by the second aspect.

Disclosed herein according to a fifth aspect of the presently disclosed and/or claimed inventive concept(s) is provided an attachment configured for attachment to a container of a beverage or foodstuff preparation machine according to the first aspect. The attachment may comprise: a carrier carrying on a surface thereof a code as described in the first aspect; an attachment member for attachment to said container. In certain non-limiting embodiments, the attachment member is configured for attaching said carrier to the container as if it were formed integrally on the container. In this way it can be read by the code reading device as if it formed integrally thereto. Examples of suitable attachment members comprise: an adhesive strip; a mechanical fastener such as a clip or bolt. The attachment can be considered a code support member. The attachment may be for attachment to part of the container, e.g.: generally part of or the entire lid, flange, body of a capsule or receptacle; a rim or of a packet. The attachment may be shaped corresponding to a periphery of the container, e.g. it is disk or annular shaped.

The attachment may comprise part of the system according to the third aspect, i.e. a system comprising the said machine the attachment attached to the container which may not otherwise comprise a code.

In a similar manner the method according to the fourth aspect may comprise attaching the attachment to a container which may not otherwise comprise the code and subsequently performing the said method.

Disclosed herein according to a sixth aspect of the presently disclosed and/or claimed inventive concept(s) is provided an attachment configured for attachment to a beverage or foodstuff preparation machine according to the second aspect. The attachment may comprise: a carrier carrying on a surface thereof a code as described in the first aspect; an attachment member for attachment to said machine. In certain non-limiting embodiments, the attachment member is configured for attaching said carrier to the machine at a position between code reading device of said machine and the container when received, such that the code thereon is proximate said container. In this way it can be read by the code reading device as if it were attached to the container. Examples of suitable attachment members comprise: extensions attached to said carrier comprising an adhesive strip or a mechanical fastener such as a clip, bolt or bracket.

The attachment may comprise part of the system according to the third aspect, i.e. a system comprising the said machine the attachment attached to the machine and a container which may not otherwise comprise a code.

In a similar manner the method according to the fourth aspect may comprise attaching the attachment to the machine and subsequently performing the said method using a container which may not comprise said code.

Disclosed herein according to a seventh aspect of the presently disclosed and/or claimed inventive concept(s) is provided a use of a container as defined in the first aspect or the attachments as defined in the fifth and sixth aspect for a beverage or foodstuff preparation machine as defined in the second aspect.

Disclosed herein according to an eighth aspect of the presently disclosed and/or claimed inventive concept(s) is provided a computer program (which can be considered a code processing program) for a processor of a code processing system of a beverage or foodstuff preparation machine as defined the second aspect, the computer program comprising program code to: obtain (e.g. by controlling a code reading system) encoded preparation information of a code of a container according to the first aspect; process the encoded preparation information to decode said information.

The computer program may further comprise program code for effecting any of the steps of processing of the encoded preparation information as defined by the second aspect.

The computer program typically outputs the decoded preparation information to a main beverage preparation program, which is executed to perform a preparation operation using said decoded information.

Disclosed herein according to a ninth aspect of the presently disclosed and/or claimed inventive concept(s) is provided a non-transitory computer readable medium comprising the computer program according to seventh aspect. The non-transitory computer readable medium may comprise a memory unit of the processor or other computer-readable storage media for having computer readable program code stored thereon for programming a computer, e.g. a hard disk, a CD-ROM, an optical storage device, a magnetic storage device, Flash memory.

The above aspects of the presently disclosed and/or claimed inventive concept(s) may be combined in any suitable combination. Moreover, various features herein may be combined with one or more of the above aspects to provide combinations other than those specifically illustrated and described. Further objects and advantageous features of the presently disclosed and/or claimed inventive concept(s) will be apparent from the claims, from the detailed description, and annexed drawings.

Preparation System

A beverage or foodstuff preparation system 2, an example of which is illustrated in FIG. 1, comprises at a first level thereof: a beverage or foodstuff preparation machine 4; a container 6, which are described sequentially.

Preparation Machine

Figure 1B:
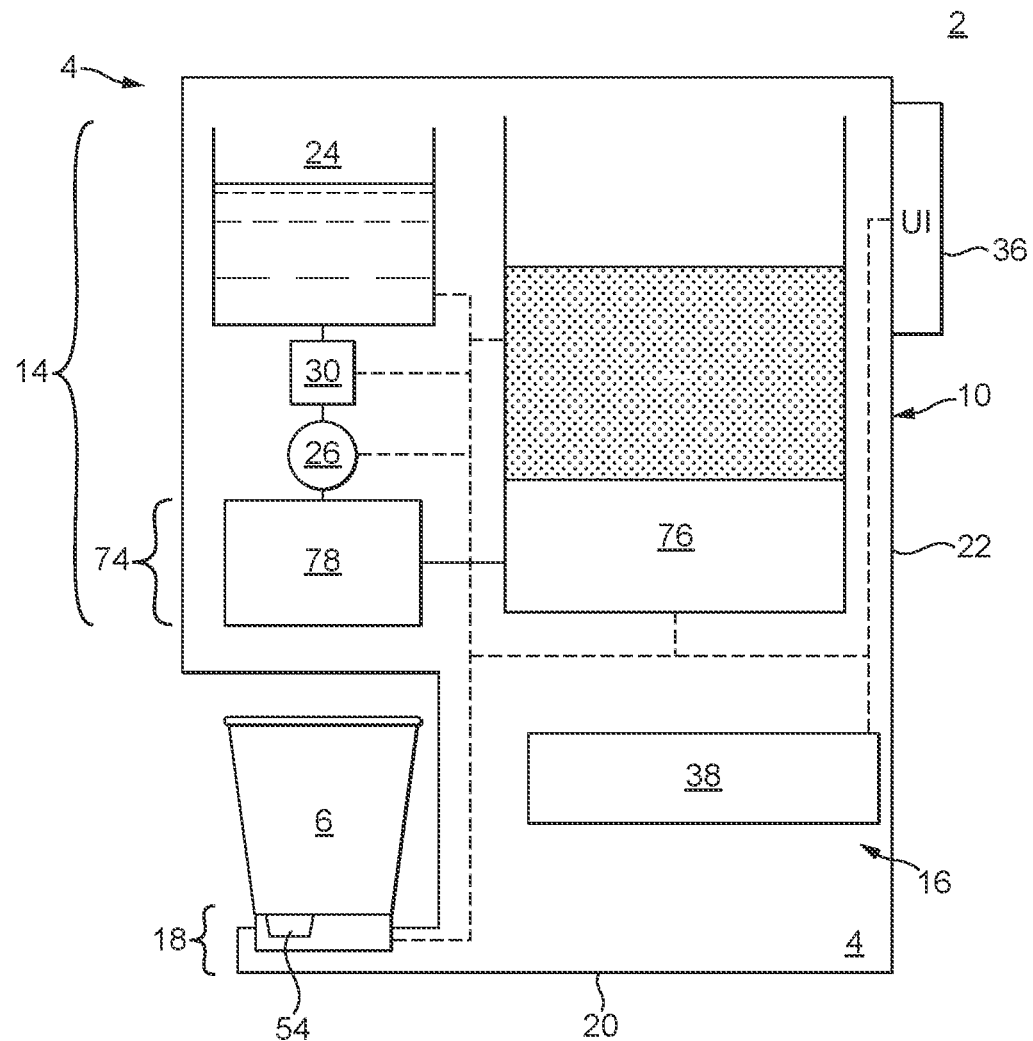

The beverage or foodstuff preparation machine 4 is operable to process a portion of beverage or foodstuff material, hereon preparation material, to a foodstuff and/or beverage for consumption by eating and/or drinking. A foodstuff material as defined herein may comprise a substance capable of being processed to a nutriment generally for eating, which may be chilled or hot, non-exhaustive examples of which are: yoghurt; mousse; parfait; ice cream; sorbet; breakfast cereals; semolina; couscous; custard; smoothies. A beverage material as defined herein may comprise a substance capable of being processed to a potable substance, which may be chilled or hot, non-exhaustive examples of which are: tea; coffee, including ground coffee; hot chocolate. The preparation machine 4 is generally dimensioned for use on a work top, i.e. it is less than 70 cm in length, width and height. The preparation machine 4 may have various configurations depending on the particular type of beverage and/or foodstuff it is intended for preparation of, examples of which are:

a first embodiment, an example of which is shown in FIG. 1A, wherein the preparation machine 4 is generally for beverage preparation and is operable to extract one or more ingredients of preparation material within a single use container 6 (comprising a latter mentioned code), such as a packet or capsule, and to dispense said ingredients into an alternate receptacle for end-user consumption (which does not comprise a code), examples of suitable preparation machines 4 are disclosed in EP 2393404 A1, EP 2470053 A1, EP 2533672 A1, EP 2509473 A1 EP 2685874 A1, EP 2594171 A1, which are incorporated herein by reference;

a second embodiment, an example of which is illustrated in FIG. 1B, wherein the preparation machine 4 is for beverage or foodstuff preparation and is operable to prepare preparation material that is supplied in a container 6 that is a receptacle (comprising the latter mentioned code) for end-user consumption therefrom, example of a suitable preparation machine is provided in PCT/EP13/072692, WO 2013/014142, WO 2010/034722, which are incorporated herein by reference;

a third embodiment (not shown) wherein the preparation machine 4 is generally for foodstuff preparation and is operable to dispense preparation material that is supplied in a container 6 (which comprises the code), such as a packet or capsule, into an alternate receptacle (which does not comprise the code) for end-user consumption, wherein the foodstuff is prepared in the said receptacle, an example of a suitable preparation machine is disclosed in PCT/EP13/072692, and EP 14167344A, which is incorporated herein by reference.

For completeness a several such preparation machines 4 will now be described in more detail, which can be considered to comprise at a first level thereof: a housing 10; a preparation unit 14; a control system 16; code processing system 18, which are described sequentially.

Housing

The housing 10 houses and supports said first level components and comprises at a second level of the preparation machine 4: a base 20 for abutment of a horizontally arranged support surface; a body 22 for mounting thereto the other first level components.

Preparation Unit

Depending on the embodiment of the preparation machine 4, the preparation unit 14 is operable to prepare a foodstuff/beverage from preparation material arranged in: a single-serving, single use container 6 that is a packet or capsule; a container 6 that is a receptacle for end-user consumption therefrom; a combination thereof. Embodiments of each configuration will be discussed.

In general all the embodiment preparation units 14 comprises a second level of said machine 4 a fluid supply 12 that is operable to supply fluid, which is in general water or milk that maybe conditioned (i.e. heated or cooled) to the container 6. The fluid supply 12 typically comprises at a third level of said machine 4: a reservoir 24 for containing fluid, which in most applications is 1-5 liters of fluid; a fluid pump 26, such as a reciprocating or rotary pump that may be driven by an electrical motor or an induction coil; a an optional fluid heater 28, which generally comprises an in-line, thermo block type heater; an outlet for supply of the fluid. The reservoir 24, fluid pump 26, fluid heater 28, and outlet are in fluid communication with each other in any suitable order. In an alternative example the fluid supply 12 may comprise a connection to an external fluid source e.g. a water main.

Preparation Unit for Extraction of Beverage Ingredients from Container

According to the first embodiment of the preparation machine 4, an example of which is illustrated in FIG. 1A, the preparation unit 14 is for extraction and is operable: to receive the container 6 containing beverage preparation material; process the container 6 to extract one or more ingredients of a beverage therefrom, and to dispense the said ingredients into an alternate receptacle 8 for end-user consumption. The container is generally a single-use, single-serving container such as a capsule or packet. A preparation unit 14 for use with the said capsule will initially be described followed by a variant machine for use with said packet.

The preparation unit 14 further comprises an extraction unit 30, which is operable to move between a capsule receiving position and a capsule extraction position, when moving from the capsule extraction position to the capsule receiving position, the extraction unit may be moved through or to a capsule ejection position, wherein a spent capsule can be ejected therefrom. The extraction unit 30 typically comprises: an injection head 32; a capsule holder 34; a capsule holder loading system 50; a capsule insertion channel 52A; a capsule ejection channel 52B, which are described sequentially.

The injection head is configured to inject fluid into a cavity of the capsule when held by the capsule holder, and to this end has mounted thereto an injector, which has a nozzle that is in fluid communication with the outlet of the fluid supply.

The capsule holder is configured to hold the capsule during extraction and to this end it is operatively linked to the injection head. The capsule holder is operable to move to implement the said capsule receiving position and capsule extraction position: with the capsule holder in the capsule receiving position a capsule can be supplied to the capsule holder from the capsule insertion channel; with the capsule holder in the capsule extraction position a supplied capsule is held by the holder, the injection head can inject fluid into the cavity of the held capsule, and one or more ingredients can be extracted therefrom. When moving the capsule holder from the capsule extraction position to the capsule receiving position, the capsule holder can be moved through or to the said capsule ejection position, wherein a spent capsule can be ejected from the capsule holder via the capsule ejection channel.

The capsule holder loading system is operable to drive the capsule holder between the capsule receiving position and the capsule extraction position.

The preparation unit 14 can operate by means of injection of fluid at pressure into the cavity of the capsule 6, e.g. at up to 20 bar, which can be achieved by means of the injection head and pump 26. It may alternatively operate by centrifugation as disclosed in EP 2594171 A1, which is incorporated herein by reference. Further examples of suitable preparation units are provided in EP 2393404 A1, EP 2470053 A1, EP 2533672 A1, EP 2509473 A1 EP 2685874 A1 and EP 2594171 A1.

In the example of the container 6 comprising a packet the extraction unit 30 is operable to receive the packet and to inject, at an inlet thereof, fluid from the fluid supply 12. The injected fluid mixes with preparation material within the packet to at least partially prepare the beverage, which exits the packet via an outlet thereof. The extraction unit 30 comprises: a support mechanism to receive an unused packet and eject a spent packet; an injector configured to supply fluid to the packet from the outlet of the fluid supply. Further detail is provided in WO 2014/125123, which is incorporated herein by reference.

Preparation Unit for Preparation in Container

According to the second embodiment of the preparation machine 4, an example of which is illustrated in FIG. 1B, the preparation unit 14 is operable to prepare preparation material in a container 6 that is a receptacle for end-user consumption therefrom, such as a cup. Herein the preparation unit 14 further comprises a mixing unit 74, examples of which are described following.

In a first example (as shown in FIG. 1B) mixing unit 74 comprises a: preparation material processing unit 76 operable to extract a predetermined dosage of preparation material from a preparation material container; a dispensing unit 78 operable to dispense fluid from the fluid supply 12 mixed with said dosage of preparation material to the container 6, such an example is disclosed in more detail in the aforesaid WO 2010/034722.

In a second example (not shown) the container 6 is supplied with the preparation material therein and the mixing unit 14 comprises an agitator unit to mix the preparation material with fluid supplied from the fluid supply 12, such an arrangement is disclosed in the aforesaid PCT/EP13/072692, WO 2013/014142 and WO 2010/034722.

According to the third embodiment of the preparation machine 4, in a variant of the directly preceding second example, the preparation unit 14 further comprises a dispensing mechanism for receiving a container 6 (in the form of a packet or capsule that comprises the code) and dispensing the associated preparation material into the receptacle, where it is prepared. Such an example is disclosed in the aforesaid EP 14167344 A.

Control System

Figure 2:
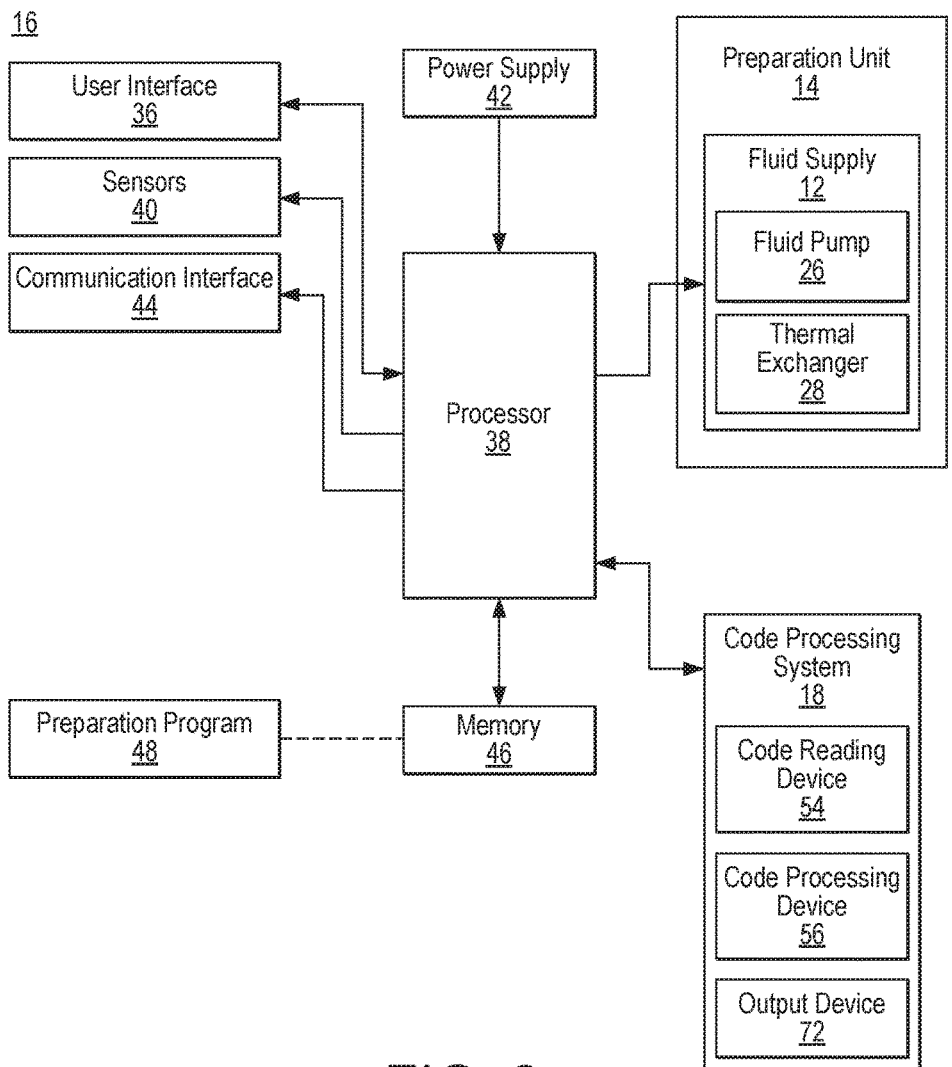
FIG. 2 is block diagram of a control system for the preparation machines of FIG. 1.

The control system 16, an example of which is illustrated in FIG. 2, is operable to control the preparation unit 14 to prepare the beverage/foodstuff. The control system 16 typically comprises at a second level of said machine 4: a user interface 36; a processor 38; optional sensors 40; a power supply 42; an optional communication interface 44, which are described sequentially.

The user interface 36 comprises hardware to enable a user to interface with the processor 38 and hence is operatively connected thereto. More particularly: the user interface receives commands from a user; a user interface signal transfers the said commands to the processor 38 as an input. The commands may, for example, be an instruction to execute a preparation process and/or to adjust an operational parameter of the preparation machine 4 and/or to power on or off the beverage preparation machine 4. The processor 38 may also output feedback to the user interface 36 as part of the preparation process, e.g. to indicate the beverage preparation process has been initiated or that a parameter associated with the process has been selected. The hardware of the user interface 36 may comprise any suitable device(s), for example, the hardware comprises one or more of the following: buttons, such as a joystick button or press button; joystick; LEDs; graphic or character LDCs; graphical screen with touch sensing and/or screen edge buttons.

The sensors 40 are operatively connected to the processor 38 to provide an input for monitoring of the preparation process and/or a status of the preparation machine 4. The input can be an analogue or digital signal. The sensors 40 typically comprise one or more of the following: fluid level sensors associated with the reservoir 24; flow rate sensors associated with the fluid pump 26; temperature sensors associated with the thermal exchanger 28; position sensors associated with the preparation unit 14 that are operable to sense the position of a component (e.g. for the extraction unit) thereof. In the second embodiment of the preparation machine 4, the sensors may further comprise one or more of the following: fluid level sensors operable to measure a fluid level in the receptacle; sensors for measuring a temperature of a product in the receptacle; sensors for measuring the torque applied by the mixing head of the agitator unit to the product; sensors for measuring the velocity of the mixing head of the agitator unit; receptacle detection sensors to detect the presence of the receptacle supported by a receptacle support. In the third embodiment of the preparation machine 4, the sensors may further comprise one or more of the following: container 6 (i.e. capsule or packet) detection sensors to detect the presence of the container supplied by a user.

The processor 38 is operable to: receive an input, i.e. the commands from the user interface 36 and/or from the sensors 40; process the input according to program code stored on a memory unit (or programmed logic); provide an output, which is generally a preparation process. In particular the output may comprise: operating the code processing system 18 to determine preparation information on the container 6; operating the preparation unit 14 in accordance with said determined information. Operation of the preparation unit 14 can be open-loop control, or (in certain particular non-limiting embodiments) closed-loop control using the input signal from the sensors 40 as feedback. The processor 38 generally comprises memory, input and output system components, which are arranged as an integrated circuit, typically as a microprocessor or a microcontroller. The processor 38 may comprise other suitable integrated circuits, such as: an ASIC; a programmable logic device such as an FPGA; an analogue integrated circuit, such as a controller. For such devices, where appropriate, the aforementioned program code can be considered programmed logic or to additionally comprise programmed logic. The processor 38 may also comprise one or more of the aforementioned integrated circuits, i.e. multiple processors. The processor 38 generally comprises a memory unit 46 for storage of the program code and optionally data. The memory unit typically comprises: a non-volatile memory e.g. EPROM, EEPROM or Flash for program code and operating parameter storage; volatile memory (RAM) for data storage. The memory unit may comprise separate and/or integrated (e.g. on a die of the processor) memory.

The program code stored on a memory unit (or programmed logic) can be idealised as comprising a preparation program 48 that is executable by the processor 38 to execute said preparation process. Typically the preparation process comprises: determining the preparation information from the container (i.e. by interfacing with the code processing system 18); using to control the preparation unit 14 said information and/or other information that may be stored as data on the memory unit 46 and/or input via the user interface 36. The determined preparation information may as an alternative or in addition be used by the preparation program 48 or a device in communication therewith (e.g. a server communicating with the preparation machine over a network such as the internet via a communication interface) to: monitor container 6 consumption for re-ordering; to scheduled maintenance of the preparation machine; to monitor machine usage.

The power supply 42 is operable to supply electrical energy to the processor 38 and associated first level components. The power supply 42 may comprise various means, such as a battery or a unit to receive and condition a mains electrical supply. The power supply 42 may be operatively linked to part of the user interface 36 for powering on or off the preparation machine 4.

The communication interface 44 is for data communication of the beverage preparation machine 4 with another device/system, typically a server system. The communication interface 44 can be used to supply and/or receive information related to the preparation process, such as container consumption information and/or preparation process information. The communication interface 44 can be configured for cabled media or wireless media or a combination thereof, e.g.: a wired connection, such as RS-232, USB, I$^2$C, Ethernet define by IEEE 802.3; a wireless connection, such as wireless LAN (e.g. IEEE 802.11) or near field communication (NFC) or a cellular system such as GPRS or GSM. The communication interface 44 is operatively connected to the processor 38. Generally the communication interface comprises a separate processing unit (examples of which are provided above) to control communication hardware (e.g. an antenna) to interface with the maser processor 38. However, less complex configurations can be used e.g. a simple wired connection for serial communication directly with the processor 38.

Code Processing System

The code processing system 18 is operable to: read a code on the container 6 to obtain encoded preparation information; process the encoded preparation information to decode the information. The code processing system 18 comprises a: code reading device 54; code processing device 56; output device 72, which are described sequentially.

The code reading device 54 is operable to read the code to obtain encoded preparation information and to transfer said information to the code processing device 56. The code reading device 54 may be configured to read the code with relative movement between a code reader thereof and the container 6, e.g. by relative rotation or translation between a code reader and the code. Examples of suitable systems for providing said relative movement are disclosed in EP 14176243.5 A, EP 15151959 A, EP 15151958 A, EP 2594171 A1, which are incorporated herein by reference. In such an example the code reading device 54 can be considered to comprise a code reader and a code reading mechanism, the code reading mechanism comprising an actuator and a drive train. As an example of such a device, the drive train may comprise a rotary member operable to rotate about an axis of rotation of a stationary container 6, the rotary member having the code reader mounted thereto, the actuator operable to drive said rotary member to rotate to effect reading of the code. In a variant, the drive train may comprise a rotary member to abut and rotate the container 6, whereby the code reader remains stationary at a radial distance from the container 6 axis of rotation.

In such examples the code reading mechanism generally comprises a read cycle sensor, which is operable to provide a read cycle signal. The read cycle signal comprises information to determine the number of read cycles contained in an acquired portion of the encoded preparation information, as will be discussed. The read cycle sensor may for example be operable to sense each rotation of the container 6 or actuator unit or other part of the drive train to provide the read cycle signal. As an example the read cycle sensor comprises a magnetic element that is driven to rotate proximate a stationary hall sensor.

Alternatively, the code reading device 54 is configured to read the code statically, i.e. without relative movement between the code reading device 54 and container, e.g. the code reading device 54 comprises an image capturing device operable to provide a digital image of the code.

The code reading device 54 may comprise various readers, which are selected in accordance with the particular formation of the code on the container 6 and the reading configuration. For example: for a code that is embossed or engraved as conductive portions on the container 6 the reader may be an inductive sensor; for a code that is printed on the container 6 the reader may be an optical sensor. An example of a suitable inductive sensor is a POSIC Sensor (www.posic.ch) reference ID1301 000002. With such a sensor the preferred (but non-limiting) reading configuration is: relative velocity of the code to the sensor 0.137 m/s; embossing depth 0.3 mm; reading distance 0.5 mm. A further example of a suitable inductive sensor is a Texas LDC 1000 series sensor. An example of a suitable optical sensor is a light source, lens and light sensor operable to translate optical impulses into electrical impulses. An example of a suitable image capturing device is a Sonix SN9S102; Snap Sensor S2 imager; an oversampled binary image sensor.

The code processing device 56 is operatively connected to the code reading device 54 and is operable to process the encoded preparation information obtained by the code reading device to decode said information. Processing of the encoded preparation information is discussed in the following paragraphs. The code processing device 56 may comprise a processor such as a microcontroller or an ASIC. It may alternatively comprise the aforesaid processor 38, in such an embodiment it will be appreciated that the output device is integrated in the processor 38. For the said processing the code processing device 56 typically comprises a code processing program, which comprises program code for said processing. An example of a suitable code processing device is the Texas Instruments TMS320C5517.

The output device 72 is operatively connected to the code processing device 56 and is operable to output data (typically digital data) that comprises the decoded preparation information to the processor 38, e.g. by means of a serial interface.

Container

The container 6 may comprise, depending on the embodiment of the preparation machine 4 a: receptacle comprising preparation material for preparation and end-user consumption therefrom; a capsule or packet comprising preparation material for preparation therefrom. The container 6 may be formed from various materials, such as metal or plastic or a combination thereof. In general the material is selected such that it is: food-safe; it can withstand the pressure/temperature of the preparation process. Generally the container is hermitically sealable for preservation of the preparation material. Suitable examples of containers are provided following.

The container 6 when not in packet form generally comprises: a body portion 58 defining a cavity for the storage of a dosage of a preparation material; a lid portion 60 for closing the cavity, and in certain non-limiting embodiments, closing such that cavity is hermetically sealed; a flange portion 62 for connection of the body portion and flange portion, the flange portion generally being arranged distal a base of the cavity. The body portion may comprise various shapes, such as a disk, frusto-conical or rectangular cross-sectioned. Generally the body portion is axisymmetric. Accordingly, it will be appreciated that the container 6 may take various forms, an example of which are provided in FIG. 3A, which may generically extend to a receptacle or capsule as defined herein. The container 6 may be distinguished as a receptacle for end-user consumption therefrom when configured with an internal volume of 250-500 or 150-350 ml. In a similar fashion a capsule may be distinguished when configured with an internal volume of less than 100 ml.

Figure 3A:
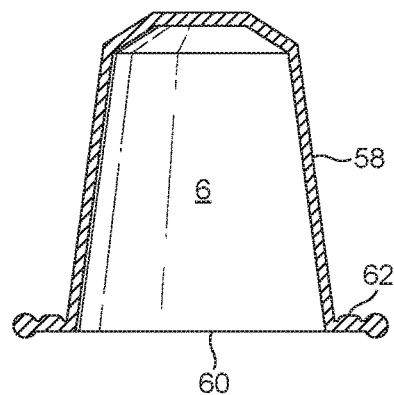
FIG. 3 shows embodiment containers for the system of FIG. 1.
Figure 3B:
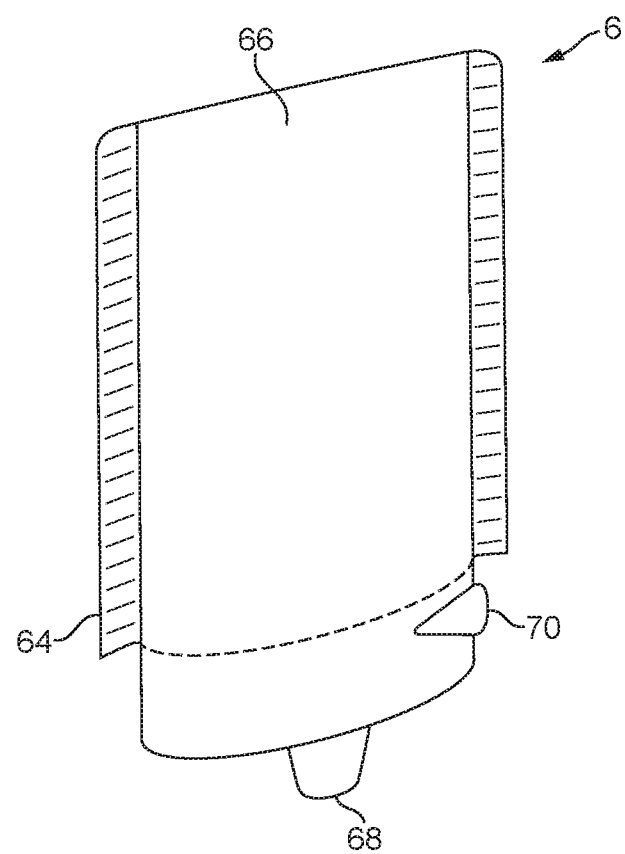

The container 6 when in packet form as shown in FIG. 3B generally comprises: an arrangement of flexible sheet material 64 (such as one or more sheets joined at their periphery) defining an internal volume 66 for the storage of a dosage of a preparation material; an inlet 68 for inflow of fluid into the internal volume 66; an outlet 70 for outflow of fluid and beverage/foodstuff material from the internal volume. Typically the inlet 68 and outlet 70 are arranged on a body of an attachment (not shown), which is attached to the sheet material. The sheet material may be formed from various materials, such as metal foil or plastic or a combination thereof. Typically the volume 66 may be 150-350 ml or 200-300 ml or 50-150 depending on the application.

Information Encoded by Code

A code 94 of the container 6 encodes preparation information, which generally comprises information related to the associated preparation process. Depending of the embodiment of the preparation machine 4 said information may encode one or more parameters, which may comprise one of more of a: fluid temperature (at container inlet and/or outlet to receptacle); fluid mass/volumetric flow rate; fluid volume; phase duration (e.g. a duration for applying the aforesaid parameters); container geometric parameters, such as shape/volume; other container parameters e.g. a container identifier, expiry date, which may for example be used to monitor container consumption for the purpose of container re-ordering.

Arrangement of Code

The code 94 is arranged on an exterior surface of the container 6 in any suitable position such that it can be processed by the code processing system 18. In the afore-discussed example of a receptacle/capsule, as shown in FIG. 3A, the code can be arranged on any exterior surface thereof, e.g. the lid, body or flange portion. In the afore-discussed example of a packet 6, as shown in FIG. 3B, the code can be arranged in any exterior surface thereof, e.g. either or both sides of the packet, including the rim. The code 94 may have various arrangements on said containers 6, e.g.: a linear arrangement for reading by a reciprocating motion; a preferred (but non-limiting) circumferentially extending arrangement about the container axis of rotation such that the code 94 can be read during rotational of the container 6 (or a code reader) about said axis.

Figure 4:
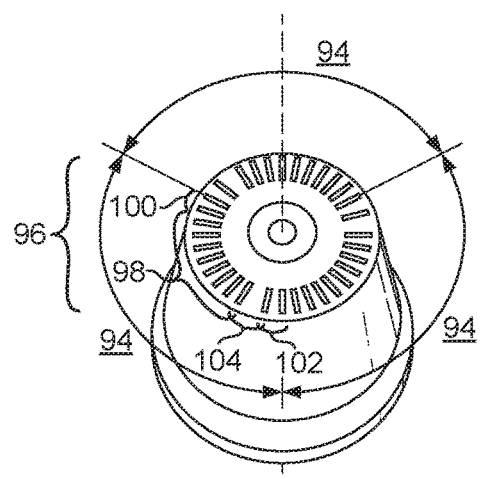
FIGS. 4-7 show embodiment codes for containers for the system of FIG. 1.

FIG. 4 shows a specific example, wherein the code 94 is arranged on an exterior surface of a base of the body portion 60 of the container 6, which can be a capsule or receptacle as defined herein. In particular the code 94 is arranged circumferentially about the container axis of rotation.

Composition of Code

The code 94 may be repeated a plurality of times on the container 6, for example 2-6 times, with each repetition thereof referred to as a code repetition. In the case of a single code repetition, code 94 may be read a single time, or in a particular (but non-limiting) example, the code 94 is read a plurality of times and the code processing device 38 is operable to perform a step of checking the reads of the code correspond to each other. Alternatively, in a particular (but non-limiting) example, wherein the code comprises a plurality of code repetitions (e.g. in FIG. 4 there are three code repetitions), each code repetition is read once or is read a plurality of times The code 94 is composed of plurality of markers 96, which are of a shape for identification of the marker (in comparison to the absence thereof) in the encoded preparation information. Generally all the markers comprise substantially the same shape such that a characteristic feature (e.g. a pulse) is provided in the encoded preparation information. In a particular (but non-limiting) example, the markers 96 are bar shaped, however they may be other shapes such as square or circular. In the example of FIG. 4 the markers 96 are rectangular with the major axis arranged radially aligned.

Typically markers 96 are formed by: printing e.g. my means of an ink printer; embossed; engraved; applying metallic layers to a non-metallic substrate (e.g. a PET strip); otherwise known means. As an example of printing the ink may be conventional printer ink and the substrate may be: polyethylene terephthalate (PET); aluminium coated with a lacquer (as found on Nespresso™ Classic™ capsules) or other suitable substrate. As an example of embossing the shape may be pressed into a plastically deformable substrate (such as the aforesaid aluminium coated with a lacquer) by a stamp. Embossing may comprise an indent that extends normal to the surface of the receptacle in either direction (i.e. the markers 96 can be defined by the absence or presence of the indent).

The dimensions of the markers 96 vary with the dimensions of the container 6 and the resolution of the code reading device 54. Generally the markers 96 when in bar form have the following dimensions: 0.6 mm-10 µm in depth, with a particular (but non-limiting) depth of 0.05 mm; 1.5 mm-5 mm in length, with a particular (but non-limiting) length of 2.5 mm; 10 mm-0.4 mm in width, with a particular (but non-limiting) width of 0.75 mm. The distance between markers 96 varies as discussed following, however it is generally within the range of 2-0.5 mm. In the case of circumferentially arranged markers 96 the distance between the markers 96 may be defined as the maximum, minimum or average circumferential distance.

Data Sequence of Code

The code 94, examples of which are illustrated in FIGS. 4-7, comprises a data sequence 98, which encodes the preparation information. The data sequence 98 consists of a plurality of marker locations, with each marker location selected to either comprise or not comprise a marker 96 as a variable to encode the preparation information. Generally, each marker location encodes a single bit, whereby a marker 96 or the absence thereof encodes either a 0 or a 1. The data sequence 98 may comprise any suitable number of marker locations, such as 8 (as in the example shown in FIGS. 4)-12, depending on the storage requirements of the code.

Figure 5:
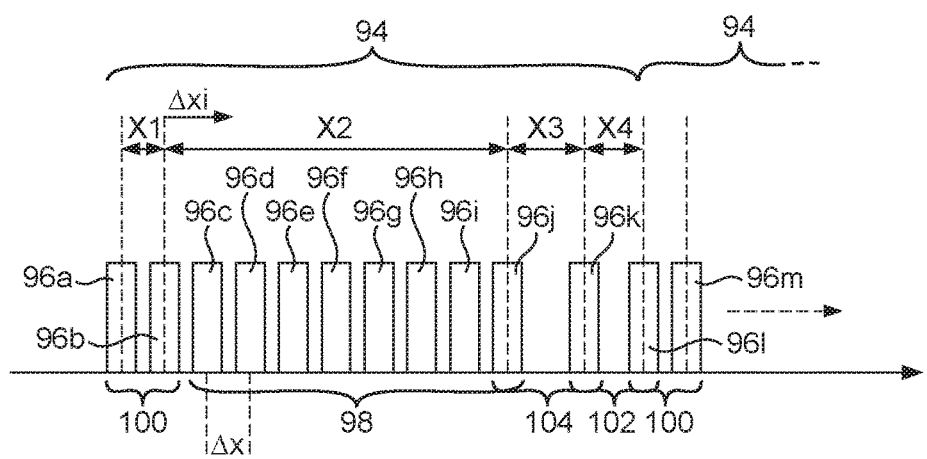

Referring to FIG. 5, which shows the code 94 more conveniently illustrated with a linear arrangement, generally each marker location is separated by the same predetermined distance $\Delta x$ from corresponding positions of adjacent marker locations. The marker location have index i, whereby i varies from 1-n, whereby 1 designates the first marker location and n designates the end marker location of said sequence. Each marker location is spaced a predetermined distance $\Delta x_j$ from a reference position, whereby the corresponding index i applies. Herein the reference position is a marker adjacent the first marker location in the data sequence, e.g. a marker of the calibration or locator sequence. In the example illustrated in FIG. 5 the reference position is marker 96b of the calibration sequence, and the first and last marker locations in the data sequence are at markers 96c and 96j respectively.

The data sequence 98 has an overall length of X2, which is equivalent to $\Delta x_n$, i.e. the distance from the reference position to the last marker location in the in the data sequence (it is also the sum of the $\Delta x$ distances).

Figure 6:
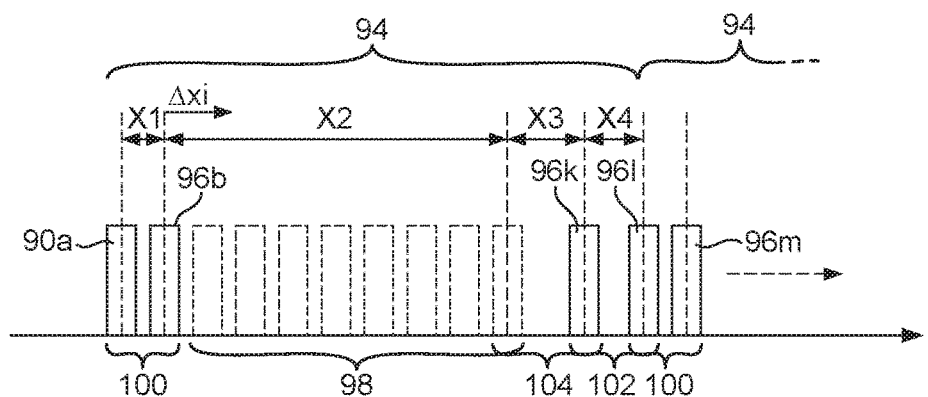

FIGS. 5 and 6 illustrated the data sequence 98 with 8 marker locations, hence a total of 8 bits are encoded: in FIG. 5 each marker location is occupied by markers 96c-96j; in FIG. 6 none of the marker locations comprises a marker. In the instance wherein the presence of a marker 96 at a marker location encodes a 1 and the absence thereof encodes a 0: the byte encoded in FIG. 5 is 11111111, and in FIG. 6 it is 00000000.

The data sequence 98 generally encodes several blocks of different preparation information. For example, 1-j blocks, whereby j comprises a machine 4 specific amount, such as 1, 2, 3, 4 or 5. In the code of FIGS. 5 and 6 j=3 hence there are three blocks: bits 1-3 (markers 96c-96e) relate to a first block; bits 4-6 (markers 96f-96h) relate to a second block; bits 7-8 (markers 96i-96j) relate to a third block.

The distance $\Delta x$ between marker locations of the data sequence 98 is in general variable between codes 94 on different containers 6 can be calibrated using a calibration sequence 100 of the code 94, which will be discussed. However the calibration sequence may be obviated by having the $\Delta x$ distance fixed, with said fixed value stored on the code processing device 56.

Calibration Sequence of Code

The calibration sequence 100 comprises a sequence of, generally two, markers 96, the distance therebetween encoding information relating to the arrangement of the marker locations of the data sequence 98. The calibration sequence 100 can be read and processed to determine the arrangement of the marker locations in the data sequence. Advantageously, the implementation of the calibration sequence 100 enables the data sequence 98 not to be limited to having a particular length X2. In this way the length of the code 94 can be suitably adapted to fill particular spaces such as a circumferential periphery of the container 6.

The calibration sequence 100 can be arranged at any know position in the code 94. In a particular (but non-limiting) example, as illustrated in FIGS. 5 and 6, it is arranged to precede the first marker of the data sequence 98.

Generally the calibration sequence comprises only two markers such that the distance therebetween is the calibration distance X1. The distance $\Delta x$ between the marker locations of the data sequence 98 is a function $f$ of X1, i.e. $X1=f(\Delta x)$, whereby said function is stored on the code processing device 56. In all the illustrated examples herein the calibration distance X1 is the exact distance Δx, rather than being a multiple (e.g. 2, 3 or 4) thereof, hence ƒ=1. The calibration distance can therefore be multiplied by the integers i from 1 to n to calculate, from the reference position, each of the predetermined distances Δxi of the marker locations in the data sequence 98.

Referring the example illustrated in FIGS. 5 and 6, the calibration sequence 100 therein comprises the markers 96*a* and 96*b* markers. Hence, the calibration sequence 100 specifies a single distance X1, which is equal to Δx. The X1 distance can therefore be multiplied by integers i=1-8 to determine the predetermined distance Δxi for each marker location.

In a further example (not shown) the calibration sequence comprises three markers, whereby: the distance between the first and second marker defines a first calibration distance; the distance between the second and third marker defines a second calibration distance; the distance between the first and third marker defines a third calibration distance. The first, second or third calibration distances may be used to calculate a more accurate averaged calibration distance X1.

Location Means for Code

The code 94 may comprise a location means in the form of a locator sequence 102 to enable the locating of the data sequence 98 (and other associated sequences when present) in the code 94. The locator sequence 102 comprises a plurality of markers 96, generally two markers, which are arranged a characteristic distance X4 apart. The characteristic distance X4 is uniquely identifiable such that the distance between any of the other markers in the rest of the code 94 does not comprise this reserved amount. In this way when processing the encoded preparation information the locator sequence 102 is located by searching for this characteristic distance X4.

The locator sequence 102 can be arranged at any know position in the code 94. In a particular (but non-limiting) example, as the illustrations in FIGS. 5 and 6 show, it is arranged to adjacent an end portion of the code. It may also be arranged adjacent the calibration sequence 100 (also shown in FIGS. 5 and 6, where in particular it is it adjacent a calibration sequence of another repetition of the code 94). Moreover in a particular (but non-limiting) example, it comprises two markers, which in the illustrations are markers 96*k* and 96*l*.

As an alternative to the locator sequence the location means may comprise a locator marker that is of a shape that permits identification of the locator marker in comparison to the other markers 96. The shape of the locator marker may for example comprise a bar which is thinner or wider than the other markers 96.

As a further alternative the location means comprises a container alignment marker configured such that a user can identify the marker and arranged such that a user can arrange the container 6 on the on the machine 4 with the container alignment marker aligned to a corresponding alignment marker of the machine 4. The alignment markers can be arranged such that when aligned the portion of the code 94 that corresponds to the data sequence 98 (or another sequence that has a known position with respect to the data sequence) is subsequently read by the code reader 38.

End Portion of Code

The code 94 may comprise an end portion to identify the location of the end of the data sequence 98. An end portion is particularly useful as it enables the data sequence to have variable length. As an alternative to an end portion the data sequence can have a fixed length, which is stored on the code processing device 56.

In a particular (but non-limiting) example, the end portion comprises a single marker and end marker location in the data sequence 98, which is arranged adjacent thereto (the marker location with index n) with a distance of X3 therebetween. Hence when there is a marker 96 at the end marker location in the data sequence 98 the end portion comprises two markers, and when there is not a marker there the end portion comprises a single marker and can be idealised a comprising a virtual marker at the end marker location.

The distance X3 is uniquely identifiable such that a distance between any of the other markers/marker locations in the rest of the code 94 do not comprise this reserved amount. In this way when the X3 distance is identified the end of the data sequence can be located. In particular, the code can be processed as follows: for a marker location of the data sequence (starting from the first marker location at the start of the data sequence, i.e. index 1) the X3 distance is added; if a marker is identified as present at the added distance then the end of the data sequence is identified; else the process is repeated for the subsequent marker in the data sequence. Advantageously, the data sequence can have variable number of marker locations (i.e. it can encode a variable number of bits) as the code is configured to self-identify the end of the data sequence.

Referring to FIG. 5, an example end portion 104 comprise the marker 90*k* and the marker location of marker 90*j*, which is the end marker location of the data sequence and marker 96*k* is shared by the locator sequence 102. Referring to FIG. 6, an example end portion 104 comprises the same marker 96*k* and the same marker location, which now is absent a marker and is indicted by the dotted line. Using FIG. 5 as an example; the X3 distance is added to the marker locations comprising markers 96*c*-96*i* whereby no marker is present at said distance; the X3 distance is added to the marker location comprising marker 96*j* and at said distance marker 96*k* is identified, thus the marker location comprising marker 96*j* is identifier as the end of the data sequence 98.

Specific Example of Code

Figure 10:
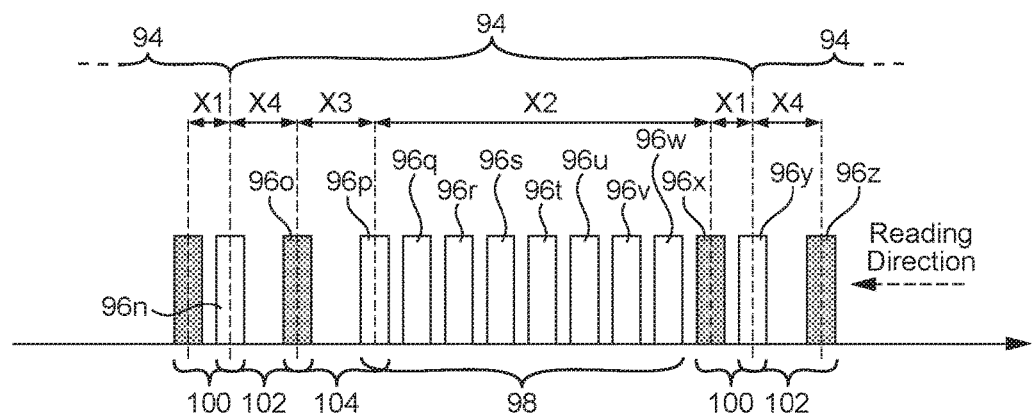
FIGS. 10-11 show embodiment codes for containers for the system of FIG. 1.

FIG. 10 shows a specific example of a container 6, which comprises three repetitions of the code 94. The code 94 comprises the data sequence 98, calibration sequence 100, locator sequence 102 and an end portion 104, whereby the corresponding X1-X4 distances are indicated. Notably the outer markers (i.e. a marker of the calibration sequence 100 and a marker of the locator sequence 102) of each code repetition are shared with the adjacent repetition. It will however be appreciated that separate markers could also be provided. The markers 96 each have an inner edge arranged proximal the container axis of rotation at diameter D1, and an outer edge distal said axis at diameter D2. With D1 and D2 set to 15.7 mm and 21 mm respectively, the average diameter Day is 18.35 mm. Using Day, the circumferential distance of each code repetition is 19.2 mm. As an example: X1 can be set to 1.6 mm; for a data sequence encoding 8 bits X2 can be defined as the product of X1 and 8 hence 12.8 mm; X4 can then be set to 2 mm; X3 is determined as 2.8 mm.

Method of Processing Code

Processing of the code 94 to decode the encoded preparation information is now discussed. For a code reading system 18 that comprises a code reading device 54 consisting of an image capturing device, it will be appreciated that the said process is relatively uncomplicated, e.g.: the encoded preparation information is provided as a captured digital image of the code (or codes); using a known feature extraction technique the location of the markers can be determined; the distances X1, X4, X3 (where present) determined and the marker locations of the data sequence read.

However in a particular (but non-limiting) example, wherein the code reading system 18 comprises a code reading device consisting of an inductive sensor or optical sensor to sequentially read the markers 96 of the code 94, the process is more complex since the encoded preparation information provided to the code processing device 56 by the code reading device generally 54 comprises an analogue signal with pulses to identify the presence (or absence) of a marker. In the following a method for processing for this particular (but non-limiting) example, is provided, for which it will be appreciated aspects are applicable to the image capturing method.

For convenience the method is decomposed in into stages: a first information acquisition stage; a second determination of a number code reads in the information stage; a third determination of location of markers in the information stage; a fourth determination of the location of the code reads in the information stage; a fifth identification of the location of the calibration sequence stage; a sixth error checking stage; a seventh processing of the data sequence stage.

Stage 1: Encoded Preparation Information Acquisition

The encoded preparation information on the codes(s) 74 of the container 6 are read by the code reading device 54 and provided as encoded preparation information to the code processing device 56.

In embodiments that comprise a code reading mechanism, the code processing device 56 may control said mechanism to effect relative motion between the container 6 and code reader for sequential reading of the markers 96 of the codes(s) 94. The code reading mechanism may output the aforesaid read cycle signal to the code processing device 56. The read cycle signal comprises information to determine the number of read cycles contained in an acquired portion of the encoded preparation information, wherein a read cycle is defined as a single complete read of the code(s) 94 on the receptacle 6. In an example wherein the container 6 comprises only a single repetition of the code 94 a read cycle comprises a single code read. In an example wherein the container 6 comprises three repetitions of the code 94 a read cycle comprises three code reads. The read cycle signal 80 may comprise a/or several pulse(s) for a particular number of read cycles. A clock signal (e.g. from a clock generator of the code processing device 56) may be used to determine the time dependency of the read cycle signal and encoded preparation information (e.g. by recording the preparation information and read cycle signal with a particular sampling frequency).

Figure 8:
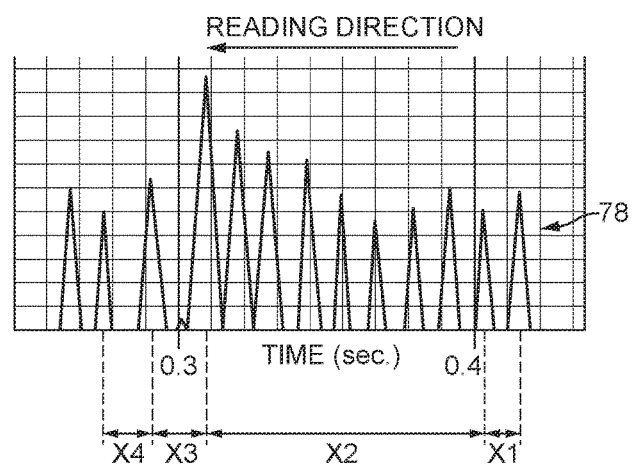
FIGS. 8-9 illustrate encoded preparation information read from the code as it is being processed.
Figure 9:
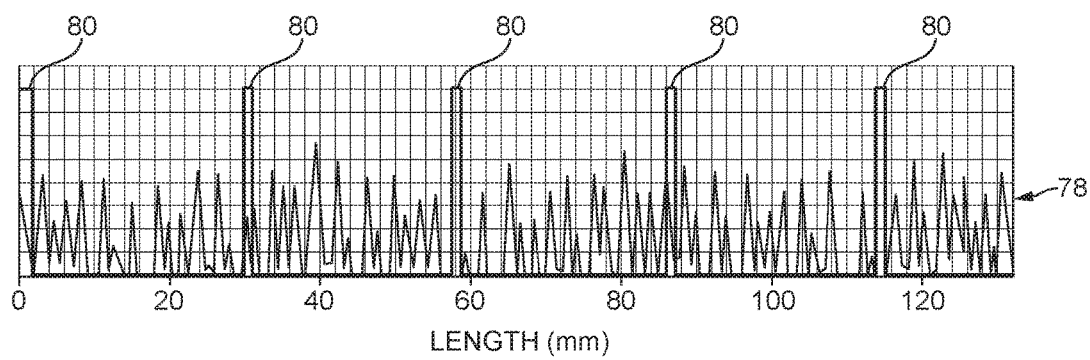

FIG. 8 shows graphically an example of the read cycle 80 signal an pulsed signal comprising encoded preparation information 78 when plotted against time (e.g. from the clock signal). In FIG. 9 the read cycle signal 80 comprises a pulse upon initiation of reading (i.e. at a time of zero) and 2 pulses for every one read cycle thereafter.

The said signals/information are stored, typically as digital data, on the code processing device and referred to hereon generally as the encoded preparation information.

Stage 2: Determination of a Number Code Reads in the Information

The number of code reads in the encoded preparation information is determined, generally to ensure there are sufficient code reads to enable satisfactory decoding of the preparation information. If the number of code reads is above/or a predetermined amount, such as 1-10 said reads are processed, else the code processing device 56 may effect further reading of the code(s) 94 to obtain more code reads or optionally terminate processing. The number of code reads in the encoded preparation information may be determined by various means. In one example the number of code reads is determined using information from the read cycle signal, and can be achieved by determining the number of read cycles from the number of pulses in said information. The location of a pulse (shown in FIG. 9) can be determined by calling the pulse locating routine as discussed following. Since a read cycle comprises a known number of code reads, the total number of code reads is calculated by the product of the read cycles and code reads per read cycle. Alternatively, the number of code reads in the preparation information is determined by counting therein the number of identified X4 distances of the locator sequence 102.

Stage 3: Determination of Location of Markers in Information

The location of the markers in the encoded preparation information is determined.

Initially the pulses in the encoded preparation information are identified generally by a characteristic feature thereof, e.g., the peak or the rise or fall of the signal at particular amplitude, each of which may be located via a derivative or otherwise. Determination using a peak is advantageous when processing pulses that are particularly sharp and also for locating the centre of the pulse. Determination using the rise or fall of the signal at particular amplitude (e.g. example 20%) is useful when processing pulses that have a plurality of crests. For said processing the code processing device 56 may comprise a known routine, which may implement regression, such as non-linear or non-parametric regression.

The location of the pulses may be defined in terms of time (as shown in FIG. 8). Said time can then be converted to a distance (as shown in FIG. 9) using the read cycle information, particularly as the read cycle information comprises a pulse for a known distance.

With the distances between the pulses known, i.e. the distance between the markers, which it is referred to hereon as, the encoded preparation information is further processed to locate the code reads therein.

Stage 4: Determination of Location of Code Reads in the Information

The following stages can be applied to a code read as in the aforesaid stages or for a code read by a code reading device 54 that comprises a image capturing device.

The location means is used to locate the individual code reads in the encoded preparation information.

In an example wherein the code of the receptacle 6 comprises the locator sequence 102, the location of the individual code reads is conveniently determined by identifying in the code read information the X4 distance for each of the code reads. To do so the markers positions are processed to determine the location of the locator sequence 104 in each code read, when doing so an error margin may be applied for example ±5%.

As an example of this process: FIG. 14 shows a first repetition of the code 94 and parts of further repetitions of the code 94. Herein the first code repetition comprises markers 96*n*-96*y* and the other code repetitions comprise the marker 96*z* and shared markers 96*n* and 96*y*. Accordingly, when processing two X4 distances are identifier: between the markers 96*n*, 96*o* and 96*y*, 96*z*.

Stage 5: Identification of Location of Calibration Sequence in Code Reads

The location of the calibration sequence 100 in the individual code reads is determined and the calibration distance X1 read, such that subsequently the arrangement of the marker locations in the data sequence 98 can be determined.

In an embodiment wherein the code(s) 94 comprises a locator sequence 102 the calibration sequence 100 is arranged at a known position with respect to the locator sequence 102, e.g. as shown in FIG. 14 it is adjacent thereto, i.e. the locator sequence comprises markers 96z and 96y, and the calibration sequence comprises the shared marker 96y, and the marker 96x.

In an example wherein the code(s) 94 do not comprise the locator sequence 102, the location of the calibration sequences 100 may be determined relative to the read cycle signal 80. The location of the calibration sequence 100 may alternatively be determined with respect to the first code read in the encoded preparation information (the location of the first code read can be synchronised in the preparation information by means of the aforesaid alignment marker), whereby the location of each subsequent code read is identified by the addition a known length of a code read to that of the first code read and the location of the calibration sequence can be at a known position in each code read.

With the location of the calibration sequence 100 determined the between its markers is read to determine the X1 distance.

Stage 6: Error Checking of Code Reads

Optionally the individual code reads are checked for errors, which can comprise checking the sequences of the code reads and/or comparing code reads. Errors in the code reads may be due to various reasons e.g.: variations in the reading velocity; markers failing to be identified; damage to a container 6. If an error is determined then typically the associated code read is discarded from the encoded preparation information.

Figure 7:
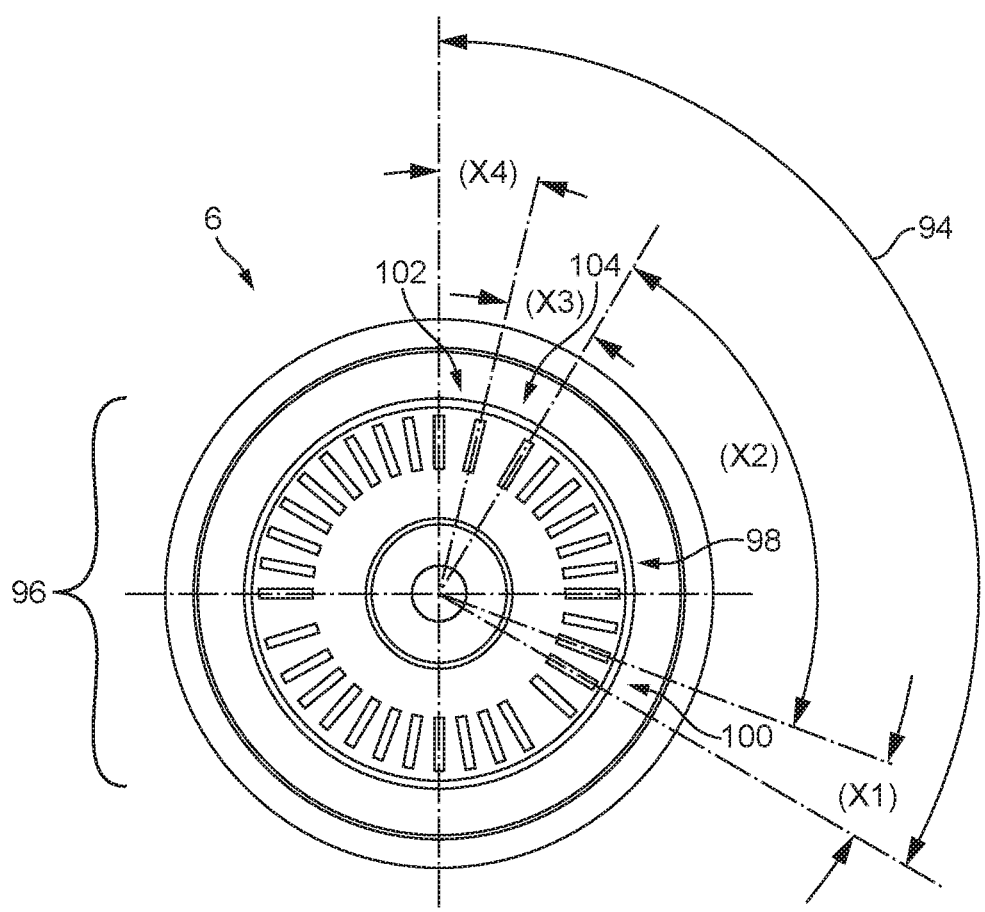

In one example a length of a portion of a code read or an entire code read may be checked. For example, the read length may be that of: X1; X1+X2; X2; X1+X2+X3; X2+X3; X1+X2+X3+X4 (i.e. the read length of a code read). Moreover, a read length between corresponding locations in consecutive code reads may be checked. If the read length is above and/or below a predetermined amount then an error may be determined. In a particular (but non-limiting) example, the X2+X3 length is checked. In the specific example that is shown in FIG. 7, X2 is 12.8 mm and X3 is 2.8 mm: the sum of X2 and X3 is therefore 15.6. A suitable first and second predetermined amount can be chosen as 14 mm and 17 mm respectively.

In a further example the number of pulses relating to markers 96 in one of or the sum of a plurality of sequences of a code read may be checked: if above or below a predetermined amount then an error may be determined. For example, the checked sequence(s) may consist of: the data sequence 98; the data sequence 98 and the calibration sequence 100; the calibration sequence 100 and the locator sequence 102; the data sequence 98 and the end portion 104; the sum of the sequences in the code read.

Stage 7: Processing of Data Sequence

For each code read the marker locations of the data sequence 98 are read and the encoded preparation information decoded. In doing so the $\Delta x$ distance is generally determined from the relationship $X1=f(\Delta x)$ (unless $\Delta x$ is a stored fixed amount), and used to determine whether a marker is present at each marker location.

The code processing device 56 can be idealised as generating a data array with dimension n, i.e. an element of the array for each marker location with an element for each marker location. To assign the array, for each element, it is determined whether the associated marker location has a corresponding marker: if present then a first value may be assigned, else (i.e. no marker is present) a second value may be assigned. Typically the first and second values are binary, hence the first value can be set to 1 and the second value can be set to 0 (or the converse).

As an example of assignment of a data array: referring to FIG. 10, there are 8 marker locations (indexed from markers 96w-96p) from the reference position (marker 96x), hence the data sequence encodes 8 bits and the array has dimension 8. Since there is a marker at each marker location each element of the array has a value of 1, or rather a byte of the array is 11111111. In the example shown in FIG. 11, there are markers 96s, 96v, 96x at marker locations 3, 5 and 8 only, hence the corresponding byte of the array is 00101001.

Figure 11:
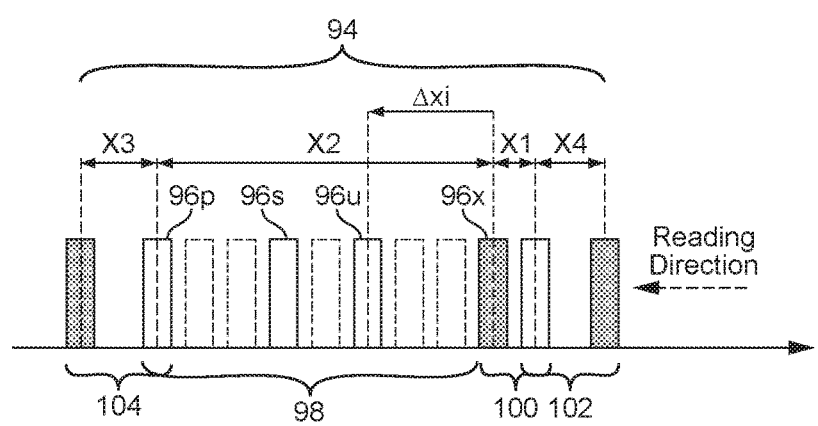

In one example the marker locations may be read by determining, for each marker of the data sequence, the distance from the reference position (in FIGS. 10 and 11 this is marker 96x). Said distances are divided by the determined $\Delta x$ distance and a floor and/or ceiling function applied to the result to convert to the nearest integer that corresponds to an element of the array. This element may then be assigned the first value i.e. 1. The default value assigned to the array may be the second value i.e. 0, hence when there is no marker the second value is assumed.

Alternatively the marker locations may be read by determining each of the predetermined distances $\Delta xi$ of the marker locations in the data sequence 98 from the reference position (in FIGS. 10 and 11 this is marker 96x). These can be calculated by the product of $\Delta x$ and i (i.e. $\Delta xi=i\Delta x$), wherein i varies from 1 to n (the number of marker locations of the data sequence). Proximate the location of these calculated predetermined distances $\Delta xi$, the presence of a marker can be determined: if present then the relevant element of the array may be assigned the first value i.e. 1, else no value is assigned, and the default value may be the second value, i.e. 0.

The elements of the array may be summed to determine a byte (e.g. 8 bits or another word length): for example, in FIG. 10 the byte is 11111111; in FIG. 11 the byte is 00101001. The bytes for each code read may be checked for errors. An example is by checking if a predetermined number of bytes are identical, whereby said predetermined number may be 50, 60 or 70% of the total number of stored bytes or an actual number of bytes, for example 2, 4 or 10. In the event sufficient bytes are identical then one of the values of the identical bytes can be assigned as a checked byte. Another example is the encoding of a parity check bit.

The byte can be decoded to determine the preparation information, e.g. by means of a lookup table. The byte may also be processed as the aforesaid individual blocks, with a lookup table applied to each. The decoded preparation information may be output by the output device 58, e.g. for use by the preparation program 48 of the processor 38 during a preparation operation.

Machine and Container Attachments

Figure 12:
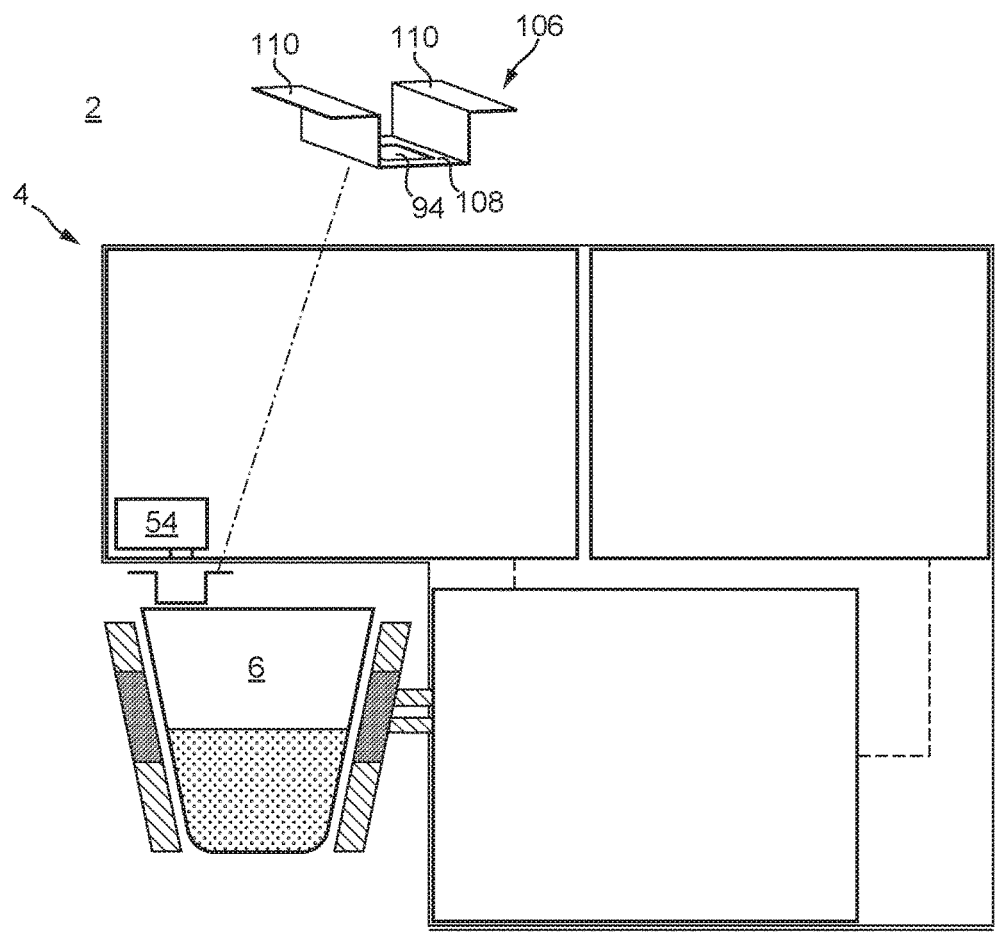
FIG. 12-13 show embodiment attachments comprising a code for the system of FIG. 1.

An attachment 106 may comprise the afore-described code 94 arranged on a surface thereof, the attachment 106 is configured for attachment to the afore-described beverage or foodstuff preparation machine 4. The attachment, an example which is illustrated in FIG. 12, comprises: a carrier 108 for carrying the code 94; an attachment member 110 for attachment of the carrier 108 to the machine 4 between an code reading device 54 of said machine 4 and a container 6 received by said machine 4 and proximate said container. In this way the code 94 can be read by the code processing device 54 as if it were attached to the container 6. Examples of suitable attachment members comprise: extensions attached to said carrier comprising an adhesive strip (as illustrated); a mechanical fastener such as a clip, bolt or bracket.

Figure 13:
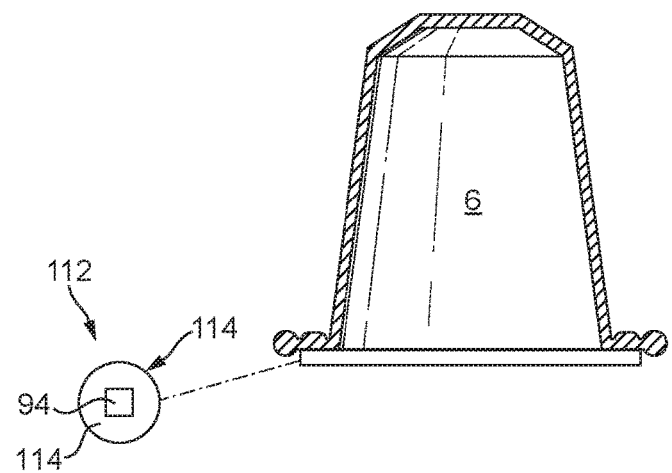

An alternate attachment 112 may comprise the afore-described code 94, arranged on a surface thereof, the attachment 112 configured for attachment to the afore-described container 6. The attachment 112, an example which is illustrated in FIG. 13, comprises: a carrier 114 for carrying of the code 94; an attachment member for attachment of the carrier 114 to the container 6. In this way the code 94 can be read by the code reading device 54 as if it were formed integrally on the container 6. Examples of suitable attachment members comprise: an adhesive strip (as illustrated); a mechanical fastener such as a clip, bolt or bracket.

LIST OF REFERENCES

2 Preparation system
4 Preparation machine
　10 Housing
　　20 Base
　　22 Body
　14 Preparation unit
　　12 Fluid supply
　　　24 Reservoir
　　　26 Fluid pump
　　　28 fluid thermal exchanger
　　Embodiment 1
　　30 Extraction unit
　　　32 Injection head
　　　34 Capsule holder
　　　50 Capsule holder loading system
　　　　52A Insertion channel
　　　　52B ejection channel
　　Embodiment 2
　　74 Mixing unit
　　　76 Preparation material container
　　　78 Dispensing unit
　16 Control system
　　36 User interface
　　38 Processor
　　　46 Memory unit
　　　　48 Preparation program
　　40 Sensors (temperature, receptacle level, flow rate, torque, velocity)
　　42 Power supply
　　44 Communication interface
　18 Code processing system
　　54 Code reading device
　　56 Code processing device
　　72 Output device
6 Container
　Capsule/Receptacle
　58 Body portion
　60 Lid portion
　62 Flange portion
　Packet
　64 Sheet material
　66 Internal volume
　68 Inlet
　70 Outlet
　　94 Code
　　　96 Markers
　　　98 Data sequence
　　　100 Calibration sequence
　　　102 Locator sequence
　　　104 End portion

The invention claimed is:

1. A container for a foodstuff or beverage preparation machine, the container for containing beverage or foodstuff preparation material and comprising a code encoding preparation information, the code comprising:
   a data sequence having a plurality of marker locations, whereby said marker locations either comprise or do not comprise a marker as a variable to at least partially encode the preparation information therein, with adjacent marker locations separated by a fixed distance of $\Delta x$, characterized in that the code further comprises:
   a locator sequence to enable location of the data sequence, the locator sequence comprising two adjacent markers, whereby a distance X4 therebetween is distinct from the fixed distance $\Delta x$;
   an end portion for identification of an end of the data sequence, the end portion comprising a marker and a marker location at the end of the data sequence, wherein a distance X3 therebetween is distinct from the fixed distance $\Delta x$ and the distance X4; and
   a calibration sequence having two adjacent markers with a distance of X1 therebetween, whereby X1 is a non-integer multiple or an integer multiple of the fixed distance $\Delta x$, the X1 distance being distinct from the X4 distance and the X3 distance.

2. The container according to claim 1, wherein adjacent marker locations of the data sequence are equally spaced such that $\Delta x$ is a fixed amount and adjacent edges of adjacent marker locations are at least 20% of a width of a marker location apart.

3. The container according to claim 1, wherein the distance X1 of the calibration sequence is an integer multiple of the fixed $\Delta x$ distance.

4. The container according to claim 1, wherein the markers of the code are arranged sequentially to each other and radially on a single circumferentially extending line, which extends about an axis of rotation of the container or other rotational axis on a surface thereof.

5. The container according to claim 1, wherein the markers of the code are formed by electrically conductive portions.

6. The container according to claim 1, wherein the code is formed on a surface of the container or on an attachment, which is attached thereto.

7. The container according to claim 1, wherein the container comprises one of the following: a capsule; a packet; a receptacle for consumption of the beverage or foodstuff therefrom.

8. A beverage or foodstuff preparation machine, said preparation machine comprising:
   a preparation unit to receive a container according to any one of claim 1, 2, 3, 4, 5, 6, or 7 and to prepare a beverage or foodstuff therefrom;
   a code processing system operable to: reading a code of said container or an attachment of the container or the machine to obtain encoded preparation information, process the encoded preparation information to decode said information;
   a control system operable to control the preparation unit using said decoded preparation information;
   wherein the code processing system is configured to process the encoded preparation information to locate one or more code reads therein by locating markers that are a predetermined distance X4 apart, and for the or each located code read(s) to determine the presence of a marker at each marker location of the data sequence, and is further configured to determine an end of the data sequence by locating an end portion of the data sequence by locating an X3 distance between a marker location of the data sequence and a marker of the end portion.

9. An attachment configured for attachment to a container for a beverage or foodstuff preparation machine according to claim 8, the attachment comprising:
  a carrier carrying on a surface thereof a code encoding preparation information, the code comprising a data sequence having a plurality of marker locations, whereby said marker locations either comprise or do not comprise a marker as a variable to at least partially encode the preparation information therein, with adjacent marker locations separated by the fixed distance of $\Delta x$, and wherein the code further comprises:
    a locator sequence to enable location of the data sequence, the locator sequence comprising two adjacent markers, whereby a distance X4 therebetween is distinct from the fixed distance $\Delta x$; and
    an end portion for identification of an end of the data sequence, the end portion comprising a marker and a marker location at the end of the data sequence, wherein a distance X3 therebetween is distinct from the fixed distance $\Delta x$ and the distance X4; and
  an attachment member for attachment to said container.

10. A non-transitory computer readable medium comprising program code to:
  obtain encoded preparation information of a code of an attachment according to claim 9;
  process the encoded preparation information to decode said information; and
  wherein the program code is configured to process the encoded preparation information to locate one or more code reads therein by locating markers that are a predetermined distance X4 apart, and for each located code read(s) to determine the presence of a marker at each marker location of the data sequence; and
  wherein the program code is further configured to determine an end of the data sequence by locating an end portion of the data sequence by locating an X3 distance between a marker location of the data sequence and a marker of the end portion.

11. An attachment configured for attachment to a beverage or foodstuff preparation machine according to claim 8, the attachment comprising:
  a carrier carrying on a surface thereof a code encoding preparation information, the code comprising a data sequence having a plurality of marker locations, whereby said marker locations either comprise or do not comprise a marker as a variable to at least partially encode the preparation information therein, with adjacent marker locations separated by the fixed distance of $\Delta x$, and wherein the code further comprises:
    a locator sequence to enable location of the data sequence, the locator sequence comprising two adjacent markers, whereby a distance X4 therebetween is distinct from the fixed distance $\Delta x$; and
    an end portion for identification of an end of the data sequence, the end portion comprising a marker and a marker location at the end of the data sequence, wherein a distance X3 therebetween is distinct from the distance fixed $\Delta x$ and the distance X4; and
  an attachment member for attachment to said machine.

12. A non-transitory computer readable medium comprising program code to:
  obtain encoded preparation information of a code of an attachment according to claim 11;
  process the encoded preparation information to decode said information; and
  wherein the program code is configured to process the encoded preparation information to locate one or more code reads therein by locating markers that are a predetermined distance X4 apart, and for each located code read(s) to determine the presence of a marker at each marker location of the data sequence; and
  wherein the program code is further configured to determine an end of the data sequence by locating an end portion of the data sequence by locating an X3 distance between a marker location of the data sequence and a marker of the end portion.

13. A beverage or foodstuff preparation system comprising:
  a container according to any one of claim 1, 2, 3, 4, 5, 6, or 7;
  a preparation unit to receive the container and to prepare a beverage or foodstuff therefrom;
  a code processing system operable to: reading a code of said container and decoding preparation information contained therein; and
  a control system operable to control the preparation unit using said decoded preparation information;
  wherein the code processing system is configured to process the encoded preparation information to locate one or more code reads therein by locating markers that are a predetermined distance X4 apart, and for the or each located code read(s) to determine the presence of a marker at each marker location of the data sequence, and is further configured to determine an end of the data sequence by locating an end portion of the data sequence by locating an X3 distance between a marker location of the data sequence and a marker of the end portion.

14. A method of preparing a beverage or foodstuff using the system according to claim 13, the method comprising:
  reading the code of the container or an attachment of the container or machine to obtain encoded preparation information;
  processing the encoded preparation information to decode said information;
  controlling a preparation operation using said preparation information;
  wherein processing the encoded preparation information comprises locating one or more code reads therein by locating markers that are a predetermined distance X4 apart, and for each of the located code read(s);
  determining the presence of a marker at each marker location of the data sequence; and
  determining an end of the data sequence by locating an end portion of the data sequence by locating an X3 distance between a marker location of the data sequence and a marker of the end portion.

15. A non-transitory computer readable medium comprising program code to:
  obtain encoded preparation information of a code of a container according any one of claim 1, 2, 3, 4, 5, 6, or 7;
  process the encoded preparation information to decode said information; and
  wherein the program code is configured to process the encoded preparation information to locate one or more code reads therein by locating markers that are a predetermined distance X4 apart, and for each located code read(s) to determine the presence of a marker at each marker location of the data sequence; and wherein the program code is further configured to determine an end of the data sequence by locating an end portion of the data sequence by locating an X3 distance between a marker location of the data sequence and a marker of the end portion.

16. A method of encoding preparation information, the method comprising:

arranging a code on at least one of:
- a container for a food stuff or beverage preparation machine, the container for containing beverage or foodstuff material; or
- an attachment for attachment to said container or said foodstuff or beverage preparation machine;

wherein the code comprises:
- a data sequence having a plurality of marker locations, whereby said marker locations either comprise or do not comprise a marker as a variable to at least partially encode the preparation information therein, with adjacent marker locations separated by a fixed distance of $\Delta x$;
- a locator sequence to enable location of the data sequence, the locator sequence comprising two adjacent markers, whereby a distance X4 therebetween is distinct from the fixed distance $\Delta x$;
- an end portion for identification of an end of the data sequence, the end portion comprising a marker and a marker location at the end of the data sequence, wherein a distance X3 therebetween is distinct from the fixed distance $\Delta x$ and the distance X4; and
- a calibration sequence having two adjacent markers with a distance of X1 therebetween, whereby X1 is a non-integer multiple or an integer multiple of the fixed distance $\Delta x$, the X1 distance being distinct from the X4 distance and the X3 distance.

* * * * *

UNITED STATES PATENT AND TRADEMARK OFFICE
CERTIFICATE OF CORRECTION

PATENT NO. : 9,928,455 B2
APPLICATION NO. : 15/122576
DATED : March 27, 2018
INVENTOR(S) : Jean-Marc Flick Page 1 of 1

It is certified that error appears in the above-identified patent and that said Letters Patent is hereby corrected as shown below:

In the Specification

Column 20, Line 56: After "diameter" delete "Day" and replace with -- Dav --
Column 20, Line 56: After "Using" delete "Day," and replace with -- Dav, --

Signed and Sealed this
Twelfth Day of June, 2018

Andrei Iancu
*Director of the United States Patent and Trademark Office*